United States Patent
Nikipelov et al.

(10) Patent No.: US 9,728,931 B2
(45) Date of Patent: Aug. 8, 2017

(54) ELECTRON INJECTOR AND FREE ELECTRON LASER

(71) Applicant: ASML Netherlands B.V., Veldhoven (NL)

(72) Inventors: Andrey Alexandrovich Nikipelov, Veldhoven (NL); Vadim Yevgenyevich Banine, Veldhoven (NL); Pieter Willem Herman De Jager, Veldhoven (NL); Gosse Charles De Vries, Veldhoven (NL); Olav Waldemar Vladimir Frijns, Veldhoven (NL); Leonardus Adrianus Gerardus Grimminck, Veldhoven (NL); Andelko Katalenic, Veldhoven (NL); Johannes Antonius Gerardus Akkermans, Veldhoven (NL); Erik Loopstra, Veldhoven (NL); Wouter Joep Engelen, Veldhoven (NL); Petrus Rutgerus Bartraij, Veldhoven (NL); Teis Johan Coenen, Veldhoven (NL); Wilhelmus Patrick Elisabeth Maria Op'T Root, Veldhoven (NL)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 15/035,674

(22) PCT Filed: Nov. 27, 2014

(86) PCT No.: PCT/EP2014/075784
§ 371 (c)(1),
(2) Date: May 10, 2016

(87) PCT Pub. No.: WO2015/082295
PCT Pub. Date: Jun. 11, 2015

(65) Prior Publication Data
US 2016/0301180 A1    Oct. 13, 2016

(30) Foreign Application Priority Data

Dec. 5, 2013  (EP) .................................... 13195806
Dec. 12, 2013  (EP) .................................... 13196853
Feb. 21, 2014  (EP) .................................... 14156258

(51) Int. Cl.
| | | |
|---|---|---|
| H01S 3/09 | (2006.01) | |
| H01J 1/34 | (2006.01) | |
| H05H 7/08 | (2006.01) | |

(52) U.S. Cl.
CPC .............. *H01S 3/0903* (2013.01); *H01J 1/34* (2013.01); *H05H 7/08* (2013.01); *H05H 2007/084* (2013.01)

(58) Field of Classification Search
CPC ............. H01S 3/0903; H05H 7/08; H01J 1/34
See application file for complete search history.

(56) References Cited

U.S. PATENT DOCUMENTS

| | | |
|---|---|---|
| 4,599,724 A | 7/1986 | McMullin |
| 4,930,130 A | 5/1990 | Burke |
| (Continued) | | |

FOREIGN PATENT DOCUMENTS

| | | |
|---|---|---|
| DE | 102013211830 | 6/2014 |
| EP | 0375861 | 7/1990 |
| (Continued) | | |

OTHER PUBLICATIONS

Kartensen et al., "Machine Protection System (MPS) for the XFEL," 16th IEEE-NPSS Real Time Conference, Beijing (2009); 6 pages.

(Continued)

*Primary Examiner* — Dung Nguyen
(74) *Attorney, Agent, or Firm* — Sterne, Kessler, Goldstein & Fox P.L.L.C.

(57) ABSTRACT

An injector arrangement for providing an electron beam. The injector arrangement comprises a first injector for providing electron bunches, and a second injector for providing electrons bunches. The injector arrangement is oper- (Continued)

able in a first mode in which the electron beam comprises electron bunches provided by the first injector only and a second mode in which the electron beam comprises electron bunches provided by the second injector only.

43 Claims, 12 Drawing Sheets

(56) References Cited

U.S. PATENT DOCUMENTS

| | | | |
|---|---|---|---|
| 4,963,113 | A | 10/1990 | Marumatsu |
| 4,963,823 | A | 10/1990 | Otto et al. |
| 4,972,419 | A | 11/1990 | Burke |
| 6,376,984 | B1 | 4/2002 | Fernandez et al. |
| 6,476,401 | B1 | 11/2002 | Veneklasen et al. |
| 7,217,924 | B1 | 5/2007 | Mankos et al. |
| 8,153,965 | B1* | 4/2012 | Adamski .......... H05H 7/08 250/251 |
| 2003/0020015 | A1 | 1/2003 | Hayashi |
| 2004/0100194 | A1 | 5/2004 | Eden et al. |
| 2005/0264148 | A1* | 12/2005 | Maldonado ....... H01J 37/073 313/103 R |
| 2006/0098782 | A1 | 5/2006 | Dunham et al. |
| 2011/0140074 | A1 | 6/2011 | Moody et al. |
| 2014/0079188 | A1 | 3/2014 | Hesselink et al. |
| 2014/0126602 | A1* | 5/2014 | Shapira .......... H01S 3/091 372/70 |
| 2014/0152175 | A1 | 6/2014 | Chang |
| 2015/0129772 | A1* | 5/2015 | Candler ........... H05H 7/04 250/396 ML |

FOREIGN PATENT DOCUMENTS

| | | |
|---|---|---|
| EP | 0383259 | 8/1990 |
| GB | 1258247 | 12/1971 |
| GB | 2065363 | 6/1981 |
| JP | H01238088 | 9/1989 |
| JP | H05145199 | 6/1993 |
| JP | 2000223052 | 8/2000 |
| WO | WO 0109915 | 2/2001 |
| WO | WO 2008138998 | 11/2008 |

OTHER PUBLICATIONS

Socol et al. "Compact 13.5-nm free electron laser for extreme ultraviolet lithography," *Physical Review Special Topics—Accelerations and Beams*, 14(040702) American Physical Society (2011); 7 pages.

Grames et al., "Ion Back-Bombardment of GaAs Photocathodes Inside DC High Voltage Electron Guns" *Proceedings of the 2005 Particle Accelerator Conference*, Knoxville, Tennessee (2875-2877), IEEE, United States (2005); 3 pages.

Corbett et al., "Instrumentation for the ASTA Photocathode Gun at SLAC", Proceedings of IBIC2013, pp. 357-360, TUPC05, retrieved from http://ibic2013.org/prepress/papers/tupc05.pdf; 4 pages.

Shirkov et al., "Advanced Studies on New Generation of Electronpositron Accelerators and Colliders for Fundamental and Applied Researches" *Proceedings of IPAC2013*, China (2013); 3 pages.

Cultera et al., "Growth and characterization of rugged sodium potassium antimonide photocathodes for high brilliance photoinjector," *Applied Physics Letters*, AIP Publishing LLC 103:103504 (2013); 4 pages.

Kong et al., "Performance of cesium telluride photocathodes as an electron source for the Los Alamos Advanced FEL" *Nuclear Instruments & Methods in Physics Research*, Elsevier Science B.V. (1995); 3 pages.

Grames et al. "Charge and fluence lifetime measurements of a dc high voltage GaAs photogun at high average current" *Physical Review Special Topics—Accelerations and Beams* 14(043501):1-12. American Physical Society (2011); 12 pages.

Altarelli, et al. "The European X-Ray Free-Electron Laser Technical Design Report," 96. European XFEL Project Team, Germany (2007); 646 pages.

Travish, et al. "High-Brightness Beams From a Light Source Injector: The Advanced Photon Source Low-Energy Undulator Test Line Linac" *arXiv preprint physics 0008041* (2000); 3 pages.

English-language Abstract for Japanese Publication No. H01238088, published Sep. 22, 1989; 2 pages.

English-language Abstract for Japanese Publication No. H05145199, published Jun. 11, 1993; 2 pages.

English-language Abstract for Japanese Publication No. 2000223052, published Aug. 11, 2000; 2 pages.

English-language Abstract for German Publication No. 102013211830, published Jun. 12, 2014; 1 page.

International Search Report directed to related International Patent Application No. PCT/EP2014/075784, mailed Apr. 28, 2015; 7 pages.

International Preliminary Report on Patentability and Written Opinion of the International Searching Authority directed to related International Patent Application No. PCT/EP2014/075784, issued Jun. 7, 2016; 14 pages.

\* cited by examiner

ELECTRON INJECTOR AND FREE ELECTRON LASER

CROSS-REFERENCE TO RELATED APPLICATIONS

This application is related to EP Patent Application No. 13195806.8, filed Dec. 5, 2013 and EP Patent Application No. 14156258.7, filed Feb. 21, 2014 and EP Application No. 13196853.9, filed Dec. 12, 2013 and which are incorporated by reference herein in its entirety.

FIELD

The present invention relates to an electron injector for providing an electron beam to a free electron laser. The electron injector may form part of an injector arrangement. The free electron laser may be used to generate radiation for a lithographic apparatus.

BACKGROUND

A lithographic apparatus is a machine constructed to apply a desired pattern onto a substrate. A lithographic apparatus can be used, for example, in the manufacture of integrated circuits (ICs). A lithographic apparatus may for example project a pattern from a patterning device (e.g. a mask) onto a layer of radiation-sensitive material (resist) provided on a substrate.

The wavelength of radiation used by a lithographic apparatus to project a pattern onto a substrate determines the minimum size of features which can be formed on that substrate. A lithographic apparatus which uses EUV radiation, being electromagnetic radiation having a wavelength within the range 5-20 nm, may be used to form smaller features on a substrate than a conventional lithographic apparatus (which may for example use electromagnetic radiation with a wavelength of 193 nm).

EUV radiation for use in one or more lithographic apparatus may be produced by a free electron laser. A free electron laser may comprise at least one electron injector arrangement which provides an electron beam, and may comprise at least one injector arrangement.

It is an object of the invention to obviate or mitigate one or more problems associated with the prior art.

SUMMARY

According to a first aspect of the invention there is an injector arrangement for providing an electron beam, comprising a first injector for providing a first electron beam, and a second injector for providing a second electron beam, wherein the injector arrangement is operable in a first mode in which the electron beam output from the injector arrangement is provided by the first injector only and a second mode in which the electron beam output from the injector arrangement is provided by the second injector only, wherein the injector arrangement further comprises a merging unit configured to merge a recirculating electron beam with the electron beam provided by the first injector or with the electron beam provided by the second injector.

In this way the injector can provide the electron beam even when one of the first and second injectors is non-operational. This ensures that failure of an injector need not cause downtime of an apparatus which receives the electron beam, such as a free electron laser. Further, the injector arrangement of the first aspect allows for maintenance to be carried out on either of the first and second injectors while retaining operation of the injector arrangement as a whole.

The second injector may be operable to produce an electron beam in the first mode. The first injector may be operable to produce an electron beam in the second mode.

The second injector may be operable to produce the electron beam with electron bunches at a lower repetition rate in the first mode. The first injector may be operable to produce the electron beam with electron bunches at a lower repetition rate in the second mode. For example, the injector that is not providing an electron beam to the free electron laser may produce electron bunches having the same charge as the injector that is supplying the electron beam, but at a very low repetition rate (or duty cycle).

The injector arrangement may comprise at least one steering unit. The at least one steering unit may have a first steering mode in which the electron beam from the first injector propagates along a first path and a second steering mode in which the electron beam from the first injector propagates along a second path.

The at least one steering unit may comprise a third steering mode in which the electron beam from the second injector propagates along a third path and a fourth steering mode in which the electron beam from the second injector propagates along a fourth path.

The second and fourth paths may, for example, join a path followed by the electron beam, while the first and third paths may not join the path followed by the electron beam. In this way, when the at least one steering unit is operating in both the second steering mode and the third steering mode, the injector arrangement is operating in the first mode. Conversely, when the at least one steering unit is operating in both the first mode and the fourth mode, the injector arrangement is operating in the second mode.

The first injector may be arranged to emit the electron beam along the first path and the at least one steering unit may be arranged to divert the electron beam output by the first injector to propagate along the second path when operating in the second steering mode. In this way, active steering of the electron beam emitted by the first injector may not be required when operating in the first mode.

The second injector may be arranged to emit the electron beam along the third path and the at least one steering unit may be arranged to divert the electron beam output by the second injector to propagate along the fourth path when operating in the fourth steering mode. In this way, active steering of the electron beam emitted by the second injector may not be required when operating in the third mode.

The at least one steering unit may comprise a first steering unit arranged to steer the electron beam from said first injector and a second steering unit arranged to steer the electron beam from said second injector. The first steering unit may be independently switchable between the first steering mode and the second steering mode, and the second steering unit may be independently switchable between the third steering mode and the fourth steering mode.

The injector arrangement may further comprise at least one beam dump, wherein the first path leads to said at least one beam dump. The third path may also lead to said at least one beam dump. In this way, either or both of the first injectors may be arranged to emit electron beams in the direction of the beam dump such that the electron beams emitted by each injector do not need to be actively steered to the beam dump. This arrangement may be particularly efficient as a beam dump may be able to receive electrons from multiple directions (e.g. from both the first and third paths). Conversely, a target of the electron beam may be able to receive the electron beam from a single direction.

The injector arrangement may be arranged to direct the electron beam towards a linear accelerator of a free electron laser. A third steering unit may be disposed between the injector arrangement and the linear accelerator, the third steering unit being arranged to steer the electron beam towards the linear accelerator.

The third steering unit may be a merging unit arranged to merge the electron beam provided by the injector arrangement with an electron beam propagating in a free electron laser. For example, where the injector arrangement is used with an ERL FEL, the merging unit may merge the electron beam provided by the injector arrangement with an electron beam that has already propagated through the linear accelerator.

The injector arrangement may comprise at least one focusing unit disposed along a path travelled by the electron beam output by the first injector and/or a path of the electron beam output by the second injector. In this way, variations in charge distributions within electron bunches of the electron beams provided by the first and second injectors may be mitigated.

The first injector may be positioned such that a path length of electron beams between the first injector and a target of the electron beam is greater than a path length of electron beams between the second injector and the target; and wherein the at least one focusing unit is arranged to decrease a size of electron bunches of the electron beam output by the first injector.

The first injector may be arranged such that the at least one steering unit bends the electron beam output by the first injector through an angle of less than 90 degrees when operating in the second steering mode.

The second injector may be arranged such that the at least one steering unit bends the electron beam output by the second injector through an angle of less than 90 degrees when operating in the fourth steering mode.

The injector arrangement may be further operable in a third mode in which the injector arrangement outputs an electron beam comprising electron bunches of the electron beam from the first injector interleaved with electron bunches of the electron beam from the second injector. In this way, each injector may operate at a repetition rate that is, for example, half the repetition rate needed for one injector to provide the electron beam alone. In this way, less wear is experienced on each injector.

The first injector may be provided in a first room and the second injector may be provided in a second room which is shielded from the first room.

The injector arrangement may comprise radiation shielding between the first injector and the second injector. In this way, it is safe for maintenance or other work to be carried out on one (non-operational) injector while the other injector provides the electron beam.

The first injector may comprise a first photocathode and the second injector may comprise a second photocathode. The injector arrangement may comprise a single photocathode drive laser arranged to provide laser radiation to both the first and second photocathodes.

According to second aspect, there is provided a free electron laser arranged to produce at least one radiation beam comprising the injector arrangement of the first aspect.

The free electron laser may comprise a merging unit, wherein the injector arrangement is arranged to provide the electron beam to the merging unit.

According to a third aspect, there is provided a lithographic system comprising: a free electron laser according to the second aspect arranged to produce at least one radiation beam; and at least one lithographic apparatus, each of the at least one lithographic apparatus being arranged to receive at least one of the at least one radiation beams. The at least one radiation beam may comprise EUV radiation The at least one lithographic apparatus may comprise one or more mask inspection apparatus.

According to a fourth aspect of the invention there is provided a free electron laser comprising an injector arrangement, comprising a first electron beam injector and a second electron beam injector each configured to generate an injected electron beam, and an injector linear accelerator configured to accelerate the injected electron beam, the injector linear accelerator being an energy recovery linear accelerator, the free electron laser further comprising a second linear accelerator and an undulator.

Providing the injector linear accelerator as an energy recovery linear accelerator is advantageous because it allows energy to be provided to the injected electron beam which accelerates the electrons and makes them less susceptible to space charge effects, whilst requiring only a limited amount of energy to be used (compared with using a linear accelerator which does not use energy recovery). Reducing space charge effects allows higher quality electron bunches to be delivered to the second linear accelerator.

The injector arrangement may further comprise a merging unit. The merging unit may be upstream of the injector linear accelerator and may be configured to switch between operating in a first mode which merges an injected electron beam from the first injector with a recirculating electron beam, and operating in a second mode which merges an injected electron beam from the second injector with the recirculating electron beam.

The merging unit may comprise a combining dipole magnet which is configured to bend the recirculating electron beam through a first angle and is configured to bend the injected electron beam through a second larger angle. The merging unit may be configured to switch the polarity of the combining dipole magnet when changing between the first and second operating modes.

The first injector may be provided on a first side of an axis of the injector arrangement and the second injector may be provided on a second opposite side of the axis of the injector arrangement.

The merging unit may comprise a plurality of dipole magnets arranged as a chicane which bends the recirculating electron beam, the polarity of the dipole magnets being switchable to reverse the direction of bend applied to the recirculating electron beam.

The chicane may be configured to direct the recirculating beam towards the combining dipole magnet from the same side of the injector arrangement axis as the first injector when the merging unit is operating in the first mode, and is configured to direct the recirculating beam towards the combining dipole magnet from the same side of the injector arrangement axis as the second injector when the merging unit is operating in the second mode.

The chicane may be configured to deliver the recirculating beam to the combining dipole magnet at an angle and with a spatial position selected such that the recirculating electron beam will propagate along the injector arrangement axis when it leaves the combining dipole magnet.

The chicane dipole magnets may be electromagnets.

The first injector may comprise a plurality of dipole magnets and a plurality of quadrupole magnets configured, when the merging unit is operating in the first mode, to deliver the first injected electron beam to the combining dipole magnet at an angle and with a spatial position selected such that the first injected electron beam will propagate along the injector arrangement axis when it leaves the combining dipole magnet.

The second injector may comprise a plurality of dipole magnets and a plurality of quadrupole magnets configured, when the merging unit is operating in the second mode, to deliver the second injected electron beam to the combining dipole magnet at an angle and with a spatial position selected such that the second injected electron beam will propagate along the injector arrangement axis when it leaves the combining dipole magnet.

The dipole magnets and quadrupole magnets may be tuned to provide electron bunches with a desired quality after the injector linear accelerator.

The first injector and the second injector may both be configured to provide the injected electron beam with an energy which is below a threshold energy at which electrons would induce radioactivity in a beam dump.

The injector linear accelerator may be configured to increase the energy of the injected electron beam by at least 20 MeV.

The first injector may be provided in a first room and the second injector may be provided in a second room, each room having walls which provide shielding from electromagnetic radiation.

The second linear accelerator may be an energy recovery linear accelerator.

The second linear accelerator may be configured to increase the energy of the electron beam by 100 MeV or more after acceleration by the injector linear accelerator.

The free electron laser may comprise a first loop containing the second linear accelerator and the injector linear accelerator and a second loop containing the second linear accelerator and the undulator. The path length of the first loop may be equal to the path length of the second loop.

The first injector and the second injector may each be configured to provide electron beam clearance gaps at a rate which corresponds with the time required for electrons to travel around the first loop.

The first injector and the second injector may be provided in rooms which are above the second linear accelerator and the undulator.

According to a fifth aspect of the invention there is provided a method of producing a radiation beam using a free electron laser, the method comprising using a first electron beam injector to generate an injected electron beam and combining the injected electron beam with a recirculating electron beam, or using a second electron beam injector to generate an injected electron beam and combining the injected electron beam with the recirculating electron beam, using an injector linear accelerator to increase the energy of the injected electron beam by transferring energy from the recirculating electron beam to the injected electron beam, using a second linear accelerator to further increase the energy of the injected electron beam, and using an undulator to generate the radiation beam using the electron beam.

According to a sixth aspect of the invention there is provided an electron injector comprising a support structure arranged to support a photocathode, a beam delivery system arranged to direct a beam of radiation from a radiation source onto a region of the photocathode thereby causing the photocathode to emit a beam of electrons, an adjustment mechanism operable to change the region of the photocathode which is illuminated by the radiation beam; and a steering unit operable to apply a force to the beam of electrons to alter its trajectory such that the electrons become substantially coincident with an axis of the electron injector.

The region of the photocathode which is illuminated by the radiation beam may become damaged during use. For instance over time the peak current of the electron beam emitted from the region may decrease and/or the emittance of the electron beam may increase. Changing the region of the photocathode which is illuminated by the radiation beam allows the region of the photocathode from which the electron beam is emitted to be moved around the photocathode. This extends the useful lifetime of the photocathode by utilising a larger extent of the photocathode to emit electrons over the lifetime of the photocathode.

Changing the region of the photocathode which is illuminated by the radiation beam may displace the beam of electrons emitted from the photocathode from the axis of the electron injector. The axis may represent the desired trajectory of the electron beam upon leaving the electron source. The steering unit corrects for the displacement from the axis and thus causes the electrons to be coincident with the axis upon leaving the electron injector. This may also have the effect of separating the path of the electrons in the electron injector from the path of ions which are created downstream of the electron injector. The ions may collide with the photocathode and cause damage to the photocathode. By separating the path of the ions from the path of the electrons in the electron injector, the region of the photocathode which suffers damage from ion collisions may be separated from the region of the photocathode from which the beam of electrons is emitted. This further extends the useful lifetime of the photocathode.

The steering unit may comprise one or more electromagnets.

The steering unit may be downstream of an electron booster of the electron injector.

The region of the photocathode which is illuminated by the radiation beam may be separated from the axis of the electron injector.

The beam delivery system may be configured such that the radiation beam is not perpendicular to the photocathode when it is incident upon the photocathode.

The adjustment mechanism may comprise a radiation beam adjustment unit in the beam delivery system, the radiation beam adjustment unit being operable to change one or more properties of the radiation beam.

The radiation beam adjustment unit may be operable to change the direction of propagation of the radiation beam.

The beam delivery system may comprise a mirror arranged to reflect the radiation beam onto a region of the photocathode and the adjustment mechanism may comprise an actuator operable to change the position and/or the orientation of the mirror.

The adjustment mechanism may be operable to control the shape of the region of the photocathode which is illuminated by the radiation beam.

The adjustment mechanism may be operable to control the shape of the region of the photocathode which is illuminated by the radiation beam such that the beam of electrons emitted from the illuminated region takes on one or more desired properties after the steering unit applies a force to the beam of electrons.

The adjustment mechanism may comprise an actuator operable to change the position and/or the orientation of the photocathode.

The actuator may be operable to rotate the photocathode.

The electron injector may further comprise a controller wherein the controller is operable to control the adjustment mechanism in order to control the change of the region of the photocathode which is illuminated by the radiation beam.

The steering unit may be operable to adjust the force which is applied to the beam of electrons in response to the region of the photocathode which is illuminated by the radiation beam.

The controller may control the adjustment of the force which is applied to the beam of electrons in response to the change of the region of the photocathode which is illuminated by the radiation beam.

The electron injector may further comprise an electron beam measurement device operable to measure one or more properties of the beam of electrons.

The steering unit may be operable to adjust the force which is applied to the beam of electrons in response to the measurement of one or more properties of the beam of electrons.

The radiation source may be a laser and the beam of radiation may be a laser beam.

The laser may be a picosecond laser.

The beam of electrons may comprise a plurality of bunches of electrons.

The electron injector may further comprise an electron booster operable to accelerate the beam of electrons.

The axis may represent a desired trajectory of the beam of electrons which is output from the electron injector.

The support structure may be housed in an electron gun and the electron injector may further comprise an actuator operable to adjust the position and/or the orientation of the electron gun.

The actuator may be operable to adjust the position and/or the orientation of the electron gun in response to the change in the region of the photocathode which is illuminated by the radiation beam.

According to a seventh aspect of the invention there is provided a free electron laser comprising the electron injector according to the sixth aspect, a particle accelerator operable to accelerate the beam of electrons to relativistic speeds and an undulator operable to cause the relativistic electrons to follow an oscillating path thereby causing them to stimulate emission of coherent radiation.

The undulator may be configured to cause the relativistic electrons to emit EUV radiation.

The particle accelerator may be a linear accelerator.

According to an eighth aspect of the invention there is provided a lithographic system comprising a free electron laser according to the sixth aspect of the invention and one or more lithographic apparatus.

According to a ninth aspect of the invention there is provided a method of producing an electron beam using an electron injector, the method comprising directing a beam of radiation onto a region of a photocathode thereby causing the photocathode to emit a beam of electrons, changing the region of the photocathode which is illuminated by the radiation beam and applying a force to the beam of electrons to alter its trajectory such that the electrons are coincident with an axis of the electron injector.

Applying a force to the beam of electrons may comprise using one or more electromagnets to generate a magnetic field so as to alter the trajectory of the beam of electrons.

The region of the photocathode which is illuminated by the radiation beam may be separated from the axis of the electron injector.

Changing the region of the photocathode which is illuminated by the radiation beam may comprise changing one or more properties of the radiation beam.

Changing the region of the photocathode which is illuminated by the radiation beam may comprise changing the position and/or the orientation of the photocathode.

Changing the position and/or the orientation of the photocathode may comprise rotating the photocathode.

The method may further comprise adjusting the force which is applied to the beam of electrons in response to the change of the region of the photocathode which is illuminated by the radiation beam.

The method may further comprise measuring one or more properties of the beam of electrons.

The method may further comprise adjusting the force which is applied to the beam of electrons in response to the measurement of one or more properties of the beam of electrons.

The method may further comprise controlling the shape of the region of the photocathode which is illuminated by the radiation beam.

The shape of the region of the photocathode which is illuminated by the radiation beam may be controlled such that the beam of electrons emitted from the illuminated region takes on one or more desired properties after applying the force to the beam of electrons.

The beam of electrons may comprise a plurality of bunches of electrons.

The axis may represent a desired trajectory of the beam of electrons which is output from the electron injector.

According to a tenth aspect there is provided a method for producing radiation comprising producing an electron beam according to the method of the ninth aspect accelerating the beam of electrons to relativistic speeds and causing the relativistic electrons to follow an oscillating path thereby causing them to stimulate emission of coherent radiation.

The relativistic electrons may be caused to stimulate emission of EUV radiation.

According to an eleventh aspect of the invention there is provided a photocathode comprising a substrate in which a cavity is formed and a film of material disposed on the substrate, wherein the film of material comprises an electron emitting surface configured to emit electrons when illuminated by a beam of radiation, wherein the electron emitting surface is on an opposite side of the film of material from the cavity.

The photocathode may be subjected to collisions with ions. The cavity in the substrate serves to increase the depth into the substrate at which the ions are stopped in the photocathode. This decreases an amount of material which is sputtered from photocathode due to ion collisions. Sputtered material may be deposited onto the photocathode and may reduce the photocathode's quantum efficiency. By reducing the amount of material which is sputtered from the photocathode, any reduction in the quantum efficiency may be reduced. This increases the useful lifetime of the photocathode.

Reducing the amount of material which is sputtered from the photocathode may also prevent gradients of quantum efficiency from developing on the photocathode. This increases the stability of the current associated with an electron beam emitted from the photocathode and increases the uniformity of the charge distribution of electron bunches emitted from the photocathode. Both of these effects are particularly advantageous when using the photocathode in an electron source for a free electron laser.

Increasing the depth into the substrate at which ions are stopped in the photocathode also acts to decrease the heating of the photocathode close to the surface of the photocathode. This reduces any thermionic emission of electrons from the photocathode. This reduces a dark current emitted by the photocathode. This is advantageous when using the photocathode in an electron source for a free electron laser since it reduces stray electrons in the free electron laser which may damage components of the free electron laser.

The photocathode may include an impact region which will receive ions during operation of the photocathode.

The cavity in the substrate may be substantially aligned with the impact region.

The thickness of a portion of the photocathode disposed between the electron emitting surface and the cavity may be sufficiently thin that positively charged ions incident at that portion of the photocathode pass through that portion of the photocathode and into the cavity.

The thickness of the portion of the photocathode disposed between the electron emitting surface and the cavity may be less than 10 microns.

The photocathode may be configured to take on a desired shape after a deformation of the photocathode which is brought about by an electrostatic pressure applied to the photocathode when the photocathode is held at a voltage.

The photocathode may be configured such that after the deformation of the photocathode electric field lines associated with the voltage applied to the photocathode are substantially uniform.

The substrate may comprise an indentation in the substrate.

The cavity in the substrate may comprise a chamfer.

The substrate may comprise one or more ribs.

The one or more ribs may be arranged to strengthen the photocathode to resist an electrostatic pressure applied to the photocathode when the photocathode is held at a voltage.

The ribs may be arranged in a honeycomb structure.

The ribs may have a thickness of less than approximately 1 micron.

The substrate may comprise silicon.

The film of material may comprise one or more alkali metals.

The film of material may comprise sodium potassium antimonide.

According to a twelfth aspect of the invention there is provided an electron injector comprising a photocathode according to the eleventh aspect of the invention arranged to receive a beam of radiation from a radiation source, and an electron booster operable to accelerate a beam of electrons emitted from the photocathode.

According to a thirteenth aspect of the invention there is provided a free electron laser comprising an electron source according to the twelfth aspect of the invention, a linear accelerator operable to accelerate the beam of electrons to relativistic speeds, and an undulator operable to cause the relativistic electrons to follow an oscillating path thereby causing them to stimulate emission of coherent radiation.

The undulator may be configured to cause the electrons to emit EUV radiation.

According to a fourteenth aspect of the invention there is provided a lithographic system comprising a free electron laser according to the thirteenth aspect and one or more lithographic apparatus.

According to a fifteenth aspect of the invention there is provided a method of producing an electron beam comprising directing a beam of radiation to be incident on a region of a photocathode thereby causing the photocathode to emit a beam of electrons, wherein the photocathode comprises a substrate in which a cavity is formed and a film of material disposed on the substrate, wherein the film of material is configured to emit electrons from an electron emitting surface when illuminated by the beam of radiation, and wherein the electron emitting surface is on an opposite side of the film of material from the cavity.

Features of any aspect of the invention may be combined with features of any other aspect or aspects of the invention.

BRIEF DESCRIPTION OF THE DRAWINGS

Embodiments of the invention will now be described, by way of example only, with reference to the accompanying schematic drawings, in which.

DETAILED DESCRIPTION

Figure 1:
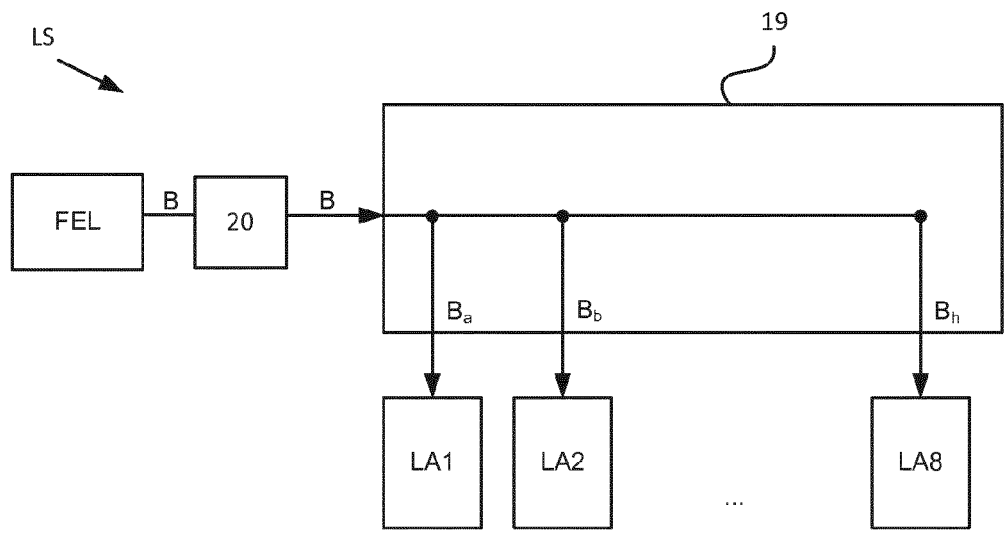
FIG. 1 is a schematic illustration of a lithographic system comprising a free electron laser according to an embodiment of the invention and eight lithographic apparatuses.

FIG. 1 shows an example of a lithographic system LS according to one embodiment of the invention. The lithographic system LS comprises a radiation source in the form of a free electron laser FEL, a beam splitting apparatus 19 and eight lithographic apparatuses LA1-LA8. The radiation source is configured to generate an extreme ultraviolet (EUV) radiation beam B (which may be referred to as a main beam). The main radiation beam B is split into a plurality of radiation beams $B_a$-$B_h$ (which may be referred to as branch beams), each of which is directed to a different one of the lithographic apparatuses LA1-LA8, by the beam splitting apparatus 19. The branch radiation beams $B_a$-$B_h$ may be split off from the main radiation beam in series, with each branch radiation beam being split off from the main radiation beam downstream from the preceding branch radiation beam. Where this is the case the branch radiation beams may for example propagate substantially parallel to each other.

The lithographic system LS further comprises beam expanding optics 20. The beam expanding optics 20 are arranged to increase the cross sectional area of the radiation beam B. Advantageously, this decreases the heat load on mirrors downstream of the beam expanding optics 20. This may allow the mirrors downstream of the beam expanding optics to be of a lower specification, with less cooling, and therefore less expensive. Additionally or alternatively, it may allow the downstream mirrors to be nearer to normal incidence. The beam splitting apparatus 19 may comprise a plurality of static extraction mirrors (not shown) arranged in the path of the beam B which direct radiation from the main beam B along the plurality of branch radiation beams $B_a$-$B_h$. Increasing the size of the main beam B reduces the accuracy with which the mirrors must be located in the beam B path. Therefore, this allows for more accurate splitting of the output beam B by the splitting apparatus 19. For example, the beam expanding optics 20 may be operable to expand the main beam B from approximately 100 μm to more than 10 cm before the main beam B is split by the beam splitting apparatus 19.

The radiation source FEL, beam splitting apparatus 19, beam expanding optics 20 and lithographic apparatuses LA1-LA8 may all be constructed and arranged such that they can be isolated from the external environment. A vacuum may be provided in at least part of the radiation source FEL, beam expanding optics 20, beam splitting apparatus 19 and lithographic apparatuses LA1-LA8 so as to minimise the absorption of EUV radiation. Different parts of the lithographic system LS may be provided with vacuums at different pressures (i.e. held at different pressures which are below atmospheric pressure).

Figure 2:
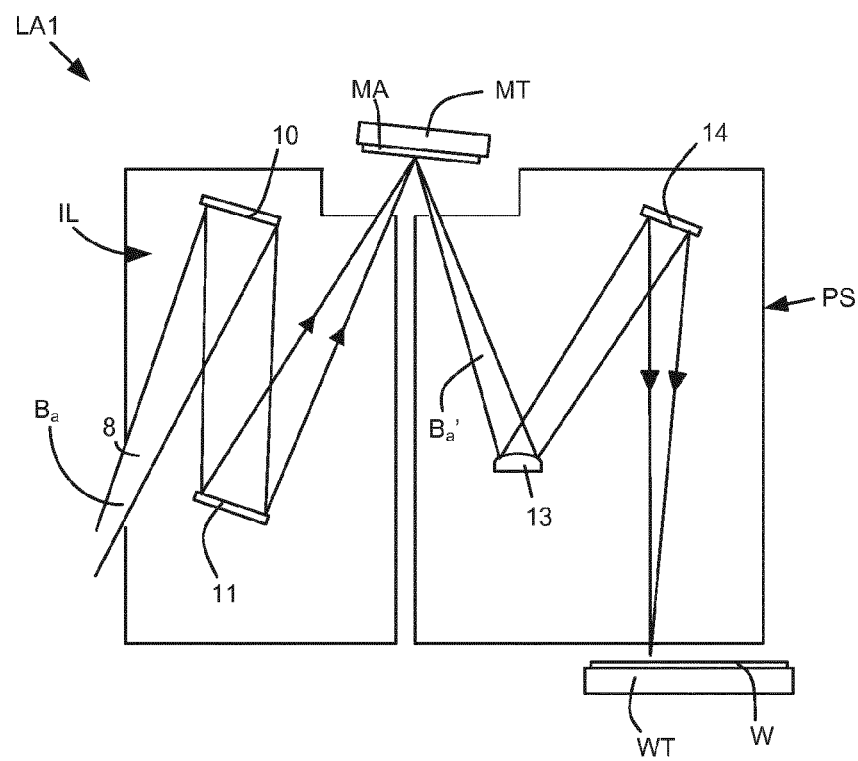
FIG. 2 is a schematic illustration of a lithographic apparatus that forms part of the lithographic system of FIG. 1.

Referring to FIG. 2, a lithographic apparatus LA1 comprises an illumination system IL, a support structure MT configured to support a patterning device MA (e.g. a mask), a projection system PS and a substrate table WT configured to support a substrate W. The illumination system IL is configured to condition the branch radiation beam $B_a$ that is received by that lithographic apparatus LA1 before it is incident upon the patterning device MA. The projection system PS is configured to project the radiation beam $B_a$' (now patterned by the mask MA) onto the substrate W. The substrate W may include previously formed patterns. Where this is the case, the lithographic apparatus aligns the patterned radiation beam $B_a$' with a pattern previously formed on the substrate W.

The branch radiation beam $B_a$ that is received by the lithographic apparatus LA1 passes into the illumination system IL from the beam splitting apparatus 19 though an opening 8 in an enclosing structure of the illumination system IL. Optionally, the branch radiation beam $B_a$ may be focused to form an intermediate focus at or near to the opening 8.

The illumination system IL may include a facetted field mirror device 10 and a facetted pupil mirror device 11. The faceted field mirror device 10 and faceted pupil mirror device 11 together provide the radiation beam $B_a$ with a desired cross-sectional shape and a desired angular distribution. The radiation beam $B_a$ passes from the illumination system IL and is incident upon the patterning device MA held by the support structure MT. The patterning device MA reflects and patterns the radiation beam to form a patterned beam $B_a$'. The illumination system IL may include other mirrors or devices in addition to or instead of the faceted field mirror device 10 and faceted pupil mirror device 11. The illumination system IL may for example include an array of independently moveable mirrors. The independently moveable mirrors may for example measure less than 1 mm across. The independently moveable mirrors may for example be microelectromechanical systems (MEMS) devices.

Following reflection from the patterning device MA the patterned radiation beam $B_a$' enters the projection system PS. The projection system PS comprises a plurality of mirrors 13, 14 which are configured to project the radiation beam $B_a$' onto a substrate W held by the substrate table WT. The projection system PS may apply a reduction factor to the radiation beam, forming an image with features that are smaller than corresponding features on the patterning device MA. A reduction factor of 4 may for example be applied. Although the projection system PS has two mirrors 13, 14 in FIG. 2, the projection system may include any number of mirrors (e.g. six mirrors).

As described above, the radiation source configured to generate an EUV radiation beam B comprises a free electron laser FEL. A free electron laser comprises a source, which is operable to produce a bunched relativistic electron beam, and a periodic magnetic field through which the bunches of relativistic electrons are directed. The periodic magnetic field is produced by an undulator and causes the electrons to follow an oscillating path about a central axis. As a result of the acceleration caused by the magnetic structure the electrons spontaneously radiate electromagnetic radiation generally in the direction of the central axis. The relativistic electrons interact with radiation within the undulator. Under certain conditions, this interaction causes the electrons to bunch together into microbunches, modulated at the wavelength of radiation within the undulator, and coherent emission of radiation along the central axis is stimulated.

The path followed by the electrons may be sinusoidal and planar, with the electrons periodically traversing the central axis, or may be helical, with the electrons rotating about the central axis. The type of oscillating path may affect the polarization of radiation emitted by the free electron laser. For example, a free electron laser which causes the electrons to propagate along a helical path may emit elliptically polarized radiation, which may be preferred for exposure of a substrate W by some lithographic apparatuses.

Figure 3:
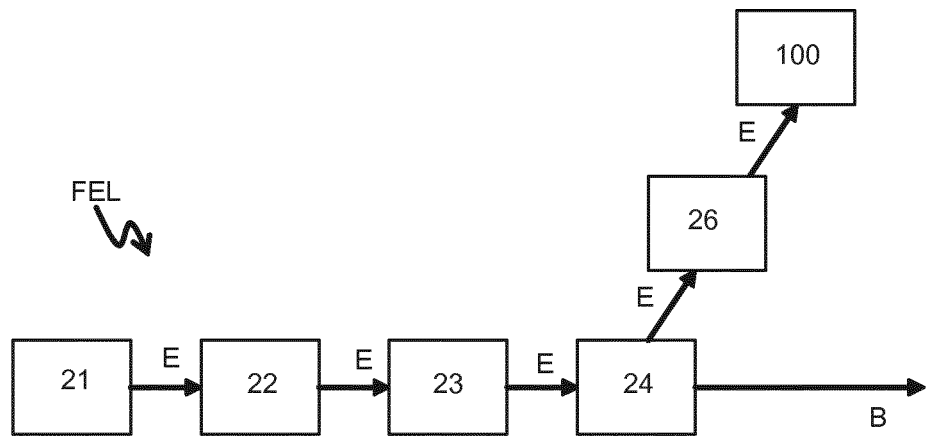
FIG. 3 is a schematic illustration of a free electron laser according to an embodiment of the invention.

FIG. 3 is a schematic depiction of a free electron laser FEL comprising an injector arrangement 21, a linear accelerator 22, an undulator 24 and a beam dump 100. A free electron laser FEL is also schematically depicted in FIG. 10 (as described further below).

The injector arrangement 21 of the free electron laser FEL is arranged to produce a bunched electron beam E and comprises an electron source such as, for example, a thermionic cathode or photocathode and an accelerating electric field. The electron beam E is accelerated to relativistic speeds by the linear accelerator 22. In an example, the linear accelerator 22 may comprise a plurality of radio frequency cavities, which are axially spaced along a common axis, and one or more radio frequency power sources, which are operable to control the electromagnetic fields along the common axis as bunches of electrons pass between them so as to accelerate each bunch of electrons. The cavities may be superconducting radio frequency cavities. Advantageously, this allows: relatively large electromagnetic fields to be applied at high duty cycles; larger beam apertures, resulting in fewer losses due to wakefields; and for the fraction of radio frequency energy that is transmitted to the beam (as opposed to dissipated through the cavity walls) to be increased. Alternatively, the cavities may be conventionally conducting (i.e. not superconducting), and may be formed from, for example, copper. Other types of linear accelerators may also be used. For example, the linear accelerator 22 may comprise a laser accelerator, wherein the electron beam E passes through a focused laser beam and the electric field of the laser beam causes the electrons to accelerate.

The injector arrangement 21 and linear accelerator 22 together provide relativistic electrons.

Optionally, the electron beam E may pass through a bunch compressor 23. The bunch compressor 23 may be disposed downstream or upstream of the linear accelerator 22. The bunch compressor 23 is configured to bunch electrons in the electron beam E and spatially compress existing bunches of electrons in the electron beam E. One type of bunch compressor 23 comprises a radiation field directed transverse to the electron beam E. An electron in the electron beam E interacts with the radiation and bunches with other electrons nearby. Another type of bunch compressor 23 comprises a magnetic chicane, wherein the length of a path followed by an electron as it passes through the chicane is dependent upon its energy. This type of bunch compressor may be used to compress a bunch of electrons which have been accelerated in a linear accelerator 22 using a plurality of radio frequency cavities.

The electron beam E then passes through the undulator 24. Generally, the undulator 24 comprises a plurality of magnets, which are operable to produce a periodic magnetic field and arranged so as to guide the relativistic electrons produced by the injector arrangement 21 and linear accelerator 22 along a periodic path. As a result, the electrons radiate electromagnetic radiation generally in the direction of a central axis of the undulator 24. The undulator 24 comprises a plurality of modules, each section comprising a periodic magnet structure. The electromagnetic radiation may form bunches (referred to as photon bunches herein) at the beginning of each undulator module. The undulator 24 further comprises a mechanism for refocusing the electron beam E such as, for example, a quadrupole magnet in between one or more pairs of adjacent modules. The mechanism for refocusing the electron beam E may reduce the size of the electron bunches, which may improve the coupling between the electrons and the radiation within the undulator 24, increasing the stimulation of emission of radiation.

The free electron laser FEL may operate in self-amplified stimulated emission (SASE) mode. Alternatively, the free electron laser FEL may comprise a seed radiation source, which may be amplified by stimulated emission within the undulator 24. A beam of radiation B propagates from the undulator 24. The radiation beam B comprises EUV radiation.

As electrons move through the undulator 24, they interact with the electric field of the radiation, exchanging energy with the radiation. In general the amount of energy exchanged between the electrons and the radiation will oscillate rapidly unless conditions are close to a resonance condition, given by:

$$\lambda_{em} = \frac{\lambda_u}{2\gamma^2}\left(1 + \frac{K^2}{A}\right), \quad (1)$$

where $\lambda_{em}$ is the wavelength of the radiation, $\lambda_u$ is the undulator period, $\gamma$ is the Lorentz factor of the electrons and K is the undulator parameter. A is dependent upon the geometry of the undulator 24: for a helical undulator A=1, whereas for a planar undulator A=2. In practice, each bunch of electrons will have a spread of energies although this spread may be minimised as far as possible (by producing an electron beam $EB_1$ with low emittance). The undulator parameter K is typically approximately 1 and is given by:

$$K = \frac{q\lambda_u B_0}{2\pi m c}, \quad (2)$$

where q and m are, respectively, the electric charge and mass of the electrons, $B_0$ is the amplitude of the periodic magnetic field, and c is the speed of light.

The resonant wavelength $\lambda_{em}$ is equal to the first harmonic wavelength spontaneously radiated by electrons moving through the undulator 24. The free electron laser FEL may operate in self-amplified stimulated emission (SASE) mode. Operation in SASE mode may require a low energy spread of the electron bunches in the electron beam $EB_1$ before it enters the undulator 24. Alternatively, the free electron laser FEL may comprise a seed radiation source, which may be amplified by stimulated emission within the undulator 24.

Electrons moving through the undulator 24 may cause the amplitude of radiation to increase, i.e. the free electron laser FEL may have a non-zero gain. Maximum gain may be achieved when the resonance condition is met or when conditions are close to but slightly off resonance.

An electron which meets the resonance condition as it enters the undulator 24 will lose (or gain) energy as it emits (or absorbs) radiation, so that the resonance condition is no longer satisfied. Therefore, in some embodiments the undulator 24 may be tapered. That is, the amplitude of the periodic magnetic field and/or the undulator period $\lambda_u$ may vary along the length of the undulator 24 in order to keep bunches of electrons at or close to resonance as they are guided though the undulator 24. Note that the interaction between the electrons and radiation within the undulator 24 produces a spread of energies within the electron bunches. The tapering of the undulator 24 may be arranged to maximise the number of electrons at or close to resonance. For example, the electron bunches may have an energy distribution which peaks at a peak energy and the tapering maybe arranged to keep electrons with this peak energy at or close to resonance as they are guided though the undulator 24. Advantageously, tapering of the undulator has the capacity to significantly increase conversion efficiency. The use of a tapered undulator may increase the conversion efficiency (i.e. the portion of the energy of the electron beam E which is converted to radiation in the radiation beam B) by more than a factor of 2. The tapering of the undulator may be achieved by reducing the undulator parameter K along its length. This may be achieved by matching the undulator period $\lambda_u$ and/or the magnetic field strength $B_0$ along the axis of the undulator to the electron bunch energy to ensure that they are at or close to the resonance condition. Meeting the resonance condition in this manner increases the bandwidth of the emitted radiation.

After leaving the undulator 24, the electromagnetic radiation (photon bunch) is emitted as the radiation beam B. The radiation beam B supplies EUV radiation to the lithographic apparatuses LA1 to LA8. The radiation beam B may optionally be directed to dedicated optical components which may be provided to direct the radiation beam B from the free electron laser FEL to the lithographic apparatuses LA1 to LA8. Since EUV radiation is generally well absorbed by all matter, reflective optical components are used (rather than transmissive components) so as to minimise losses. The dedicated optical components may adapt the properties of the radiation beam produced by the free electron laser FEL so that it is suitable for acceptance by the illumination systems IL of the lithographic apparatuses LA1 to LA8. The dedicated optical components may include the expander optics 20 and the beam splitter 19 depicted in FIG. 1.

After leaving the undulator 24, the electron beam E is absorbed by a dump 100, which may, for example, include a large amount of water or a material with a high threshold for radioactive isotope generation by high energy electron impact, for example Al with threshold of approximately 15 MeV. Before passing to the dump 100, it may be desirable to extract energy from the electron beam E to reduce its radioactivity and/or to recover at least part of the energy.

In order to reduce the energy of the electrons before they are absorbed by the beam dump 100, an electron decelerator 26 may be disposed between the undulator 24 and the beam dump 100. The electron decelerator 26 reduces the amount of energy the electrons have when they are absorbed by the beam dump 100 and will therefore reduce the levels of induced radiation and secondary particles produced in the beam dump 100. This removes, or at least reduces, the need to remove and dispose of radioactive waste from the beam dump 100. This is advantageous since the removal of radioactive waste requires the free electron laser FEL to be shut down periodically and the disposal of radioactive waste can be costly and can have serious environmental implications.

The electron decelerator 26 may be operable to reduce the energy of the electrons to below a threshold energy. Electrons below this threshold energy may not induce any significant level of radioactivity in the beam dump 100. During operation of the free electron laser FEL, gamma radiation will be present but advantageously when the electron beam E is switched off, the beam dump 100 will be safe to handle.

Components of injectors (such as cathodes) may have a relatively short operational lifetime and may require frequent replacement or maintenance. Such replacement and maintenance has a detrimental effect on the free electron lasers of which they form a part. Embodiments of the invention may provide two injectors, the injectors being configured such that one injector may be switched off to allow for maintenance whilst the other injector is operating. Embodiments of the invention may increase the operational lifetime of injector components such as cathodes.

Figure 4:
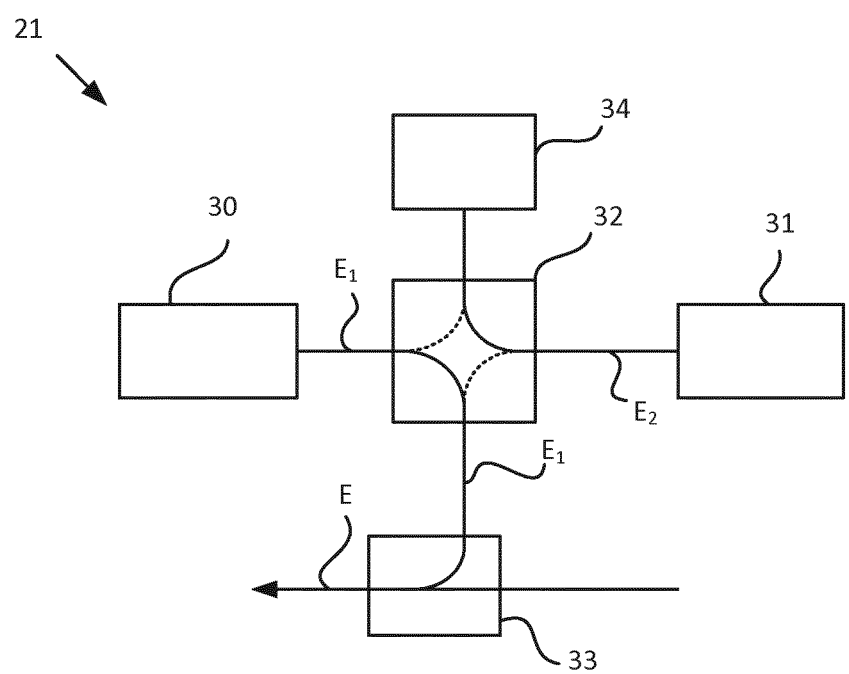
FIG. 4 is a schematic illustration of an injector arrangement according to an embodiment of the invention.

Referring to FIG. 4 an injector arrangement 21 comprises a first injector 30 and a second injector 31. Each injector 30, 31 comprises its own electron source such as, for example, a thermionic cathode or photocathode, and an accelerating electric field. A first injector 30 is arranged to produce a first bunched electron beam $E_1$, and a second injector 31 is arranged to produce a second bunched electron beam $E_2$. Each injector 30, 31 is arranged to direct its respective bunched injected electron beam $E_1$, $E_2$, to steering unit 32. The steering unit 32 is arranged to selectively direct one of the injected electron beams to an electron beam merging unit 33 (as illustrated this is the first injected electron beam $E_1$). The other of the injected electron beams is directed to an electron beam dump 34 (as illustrated this is the second injected electron beam $E_2$). The electron beam dump 34 may, for example, include a body of water or a material with a high threshold for radioactive isotope generation by high energy electron impact, for example aluminium (Al) with a threshold of approximately 15 MeV.

The steering unit 32 may be implemented in any appropriate way as will be readily apparent to the skilled person. As an example, the steering unit 32 may comprise steering magnets which can be controlled to steer an incoming injected electron beam $E_1$, $E_2$ in the direction of either the beam dump 34 or the merging unit 33.

The steering unit 32 may be considered to operate in steering modes. In a first steering mode the steering unit 32 directs the electron beam from the first injector 30 along a first path towards the beam dump 34. In a second steering mode the steering unit directs the electron beam from the first injector towards the merging unit 33.

The injected electron beam $E_1$ that is directed towards the merging unit 33 provides an output electron beam. The merging unit 33 is arranged to merge the injected electron beam provided by the steering unit 32 with an existing recirculating electron beam propagating within the free electron laser FEL and direct the merged electron beam E to the linear accelerator 22. The merging unit 33 may be implemented in any appropriate way as will be readily apparent to the skilled person. As an example, the merging unit 33 may comprise a plurality of magnets arranged to produce a magnetic field to direct the injected electron beam $E_1$ from the steering unit 32 for merging with the recirculating electron beam. It will be appreciated that upon initialization of the free electron laser FEL, there may not be a recirculating electron beam with which to merge the electron beam provided by the steering unit 32. In this case, the merging unit 33 simply provides the electron beam provided by the steering unit 32 to the linear accelerator 22.

The injector arrangement 21 of FIG. 4 allows one of the injectors 30, 31 to be serviced while the other of the injectors 30, 31 is operational. For example, FIG. 4 shows the first injector 30 as operational. That is, the electron beam $E_1$ generated by the first injector 30 is directed by the steering unit 32 to the merging unit 33 for provision to the linear accelerator 22 (denoted by the representation of electron beam $E_1$ in solid line). As depicted in FIG. 4, the second injector 31 is non-operational (denoted by the dotted line between the electron beam $E_2$ and the merging unit 33 showing that the electron beam $E_2$ does not contribute to the electron beam E).

In order to rapidly switch a non-operational injector to an operational state, the non-operational injector 31 may operate in a standby mode (standby injector) while the other injector 30 (operating injector) provides its bunched electron beam to the linear accelerator 22. The standby injector 31 may generate the same charge as the operating injector 30 but at a low duty cycle. The charge produced by the standby injector 31 may be provided to the dump 34 (as illustrated). This allows the non-operational injector 31 to quickly assume the role of the operational injector in the event that the operational injector requires maintenance.

It will be appreciated that during maintenance, a non-operational injector may be in neither the operational mode or the standby mode, but may be in an off state in which no charge is generated. Each of the injectors 30, 31 may be shielded from each other in order to create a safe environment for servicing a non-operational injector. Each injector may for example each be provided in a room having walls which provide shielding from radiation generated by the other injector. The rooms may also be shielded from other parts of the free electron laser FEL.

Figure 5:
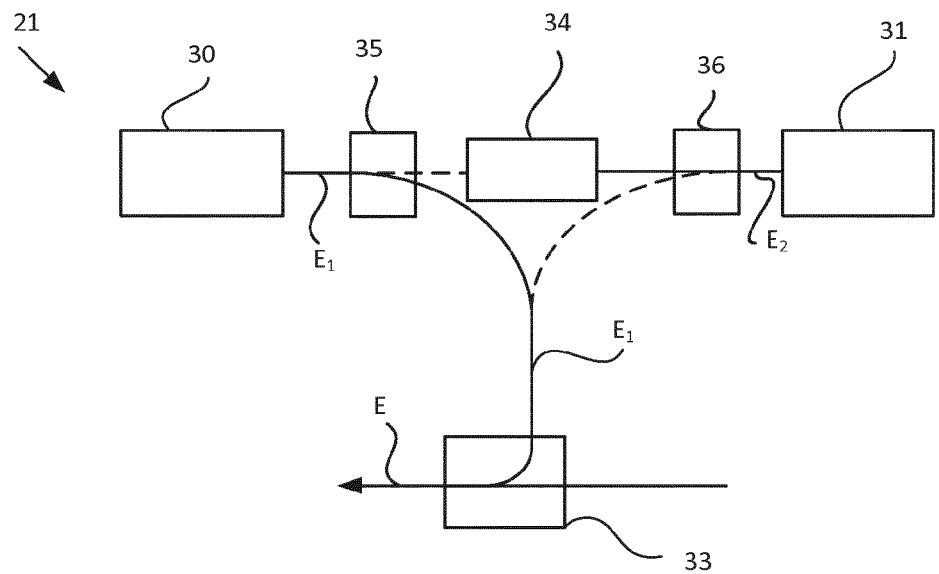
FIG. 5 is a schematic illustration of an injector arrangement according to an alternative embodiment of the invention.

FIG. 5 schematically illustrates an injector arrangement 21 according to an alternative embodiment in which like components have been provided with like reference numerals. In FIG. 5, first and second injectors 30, 31 are each arranged to direct respective electron beams $E_1$, $E_2$ in a direction of a beam dump 34. Respective steering units 35, 36 are disposed between each injector 30, 31 and the beam dump 34. Each steering unit 35, 36 may selectively direct a received electron beam to either the beam dump 34 or to a merging unit 33. As such, while one injector 30, 31 operates in a standby (or completely non-operational) mode, the other injector 30, 31 may provide an electron beam to the linear accelerator 22.

The steering units 35, 36 may be considered to operate in steering modes. In a first steering mode the first steering unit 35 directs the electron beam from the first injector 30 along a first path towards the beam dump 34. In a second steering mode the first steering unit 35 directs the electron beam from the first injector 30 towards the merging unit 33. In a third steering mode the second steering unit 36 directs the electron beam from the second injector 31 along a third path towards the beam dump 34. In a fourth steering mode the second steering unit 36 directs the electron beam from the second injector 31 towards the merging unit 33.

The arrangement of FIG. 5 may beneficially require less complicated steering mechanisms than the arrangement of FIG. 4. That is, beam dump 34 may be positioned with respect to each steering unit 35, 36 such that no adjustment to the path of electron beams $E_1$, $E_2$ is required to direct the electron beams $E_1$, $E_2$ to the beam dump 34. In this way, the steering units 35, 36 need only direct the electron beams $E_1$, $E_2$ to the merging unit 33.

Figure 6:
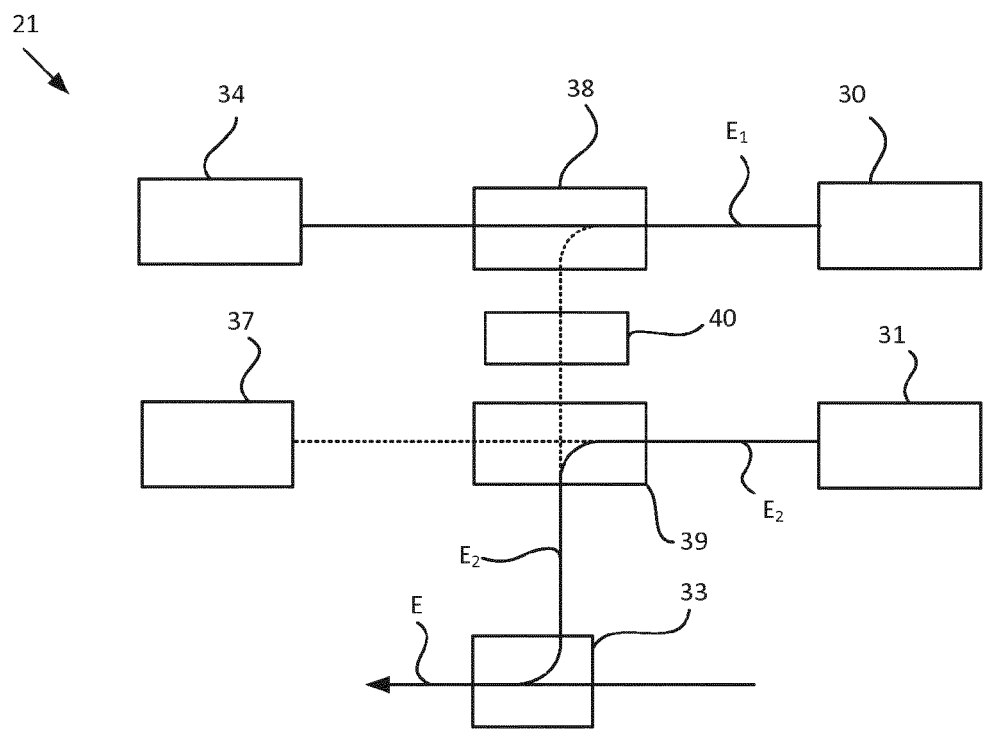
FIG. 6 is a schematic illustration of an injector arrangement according to an alternative embodiment of the invention.

It may be desirable to ensure that a charge distribution within the electron beam E provided to the merging unit 33 does not change when switching from one injector to a different injector (that is transitioning one injector from an operational state to a standby or non-operational state while transitioning another injector from a standby or non-operational state to an operational state). Differences in path lengths from each injector 30, 31 to the merging unit 33 may cause such changes in a distribution of charge within the electron beam provided to the merging unit, for example as a result of differing amounts of expansion of the electron beams from each injector. It may therefore be desirable to ensure that path lengths between all injectors and the merging unit 33 are equal.

Where path lengths between injectors and the merging unit 33 are not equal, focusing elements may be provided. FIG. 6 schematically illustrates an alternative injector arrangement 21 in which like components have been provided with like reference numerals. In the arrangement of FIG. 6, a first injector 30 is arranged to direct a first electron beam $E_1$ towards a first beam dump 34, while a second injector 31 is arranged to direct a second electron beam $E_2$ towards a second beam dump 37. Respective steering units 38, 39 are disposed between each injector 30, 31 and its respective beam dump 34, 37. Each respective steering unit 38, 39 is operable to selectively divert a received electron beam from its path towards a beam dump 34, 37 to a path towards a merging unit 33 disposed adjacent to the steering unit 39.

The steering units 38, 39 may be considered to operate in steering modes. In a first steering mode the first steering unit 38 directs the electron beam from the first injector 30 along a first path towards the beam dump 34. In a second steering mode the first steering unit 38 directs the electron beam from the first injector 30 towards the merging unit 33. In a third steering mode the second steering unit 39 directs the electron beam from the second injector 31 along a third path towards the beam dump 34. In a fourth steering mode the second steering unit 39 directs the electron beam from the second injector 31 towards the merging unit 33.

A path length of electron bunches travelling between the first injector 30 and the merger 33 is greater than a path length of electron bunches travelling between the second injector 31 and the merger 33. As such, a charge distribution within the first electron beam $E_1$ at the merging unit 33 may be different to a distribution of charge within the second electron beam $E_2$ at the merging unit 33. A focusing element 40 is provided between the first steering unit 38 and the merging unit 33. The focusing element 40 may comprise, for example, a quadrupole magnet operable to narrow or expand the first electron beam $E_1$ as necessary. The focusing element 40 may therefore adjust the focus of the first electron beam $E_1$ so that the charge distribution within the first and second electron beams $E_1$ and $E_2$ are the same at the merging unit 33.

It will be appreciated that while in the embodiment of FIG. 6, the focusing element 40 is provided between the first steering unit 38 and the merging unit 33, a focusing element may instead, or additionally be provided between the second steering unit 39 and the merging unit 33. A focusing element provided between the second steering unit 39 and the merging unit 33 may be operable to manipulate either or both of the electron beams $E_1$, $E_2$. More generally, one or more focusing elements may be provided at any point along the paths of the electron beams $E_1$, $E_2$. For example, in the embodiment of FIG. 4, if the first injector 31 is further from the steering unit 32 than the second injector 31, a focusing unit may be provided between the first injector 31 and the steering unit 32.

It will further be appreciated that while in the schematic depiction of FIG. 6 the first electron beam $E_1$ is shown as passing through the second steering unit 39, the first electron beam $E_1$ need not pass through the second steering unit 39. Further, where the first electron beam $E_1$ does pass through the second steering unit 39, the second steering unit 39 may not need to actively steer the electron beam $E_1$.

Figure 7:
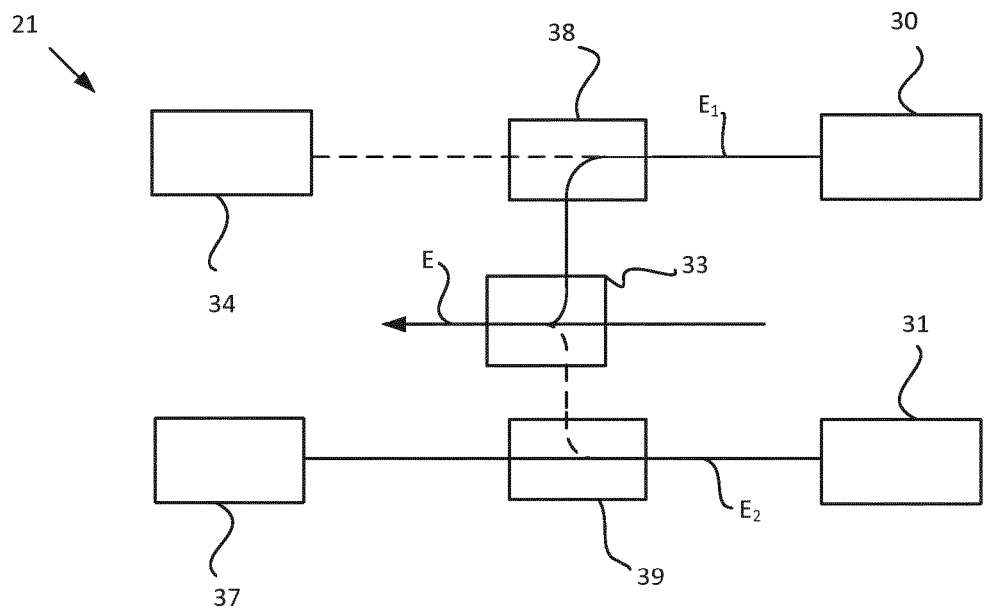
FIG. 7 is a schematic illustration of an injector arrangement according to an alternative embodiment of the invention.

In addition to path length, differences in angles through which electron beams are bent between injectors and a merging unit can result in differences in a distribution of charge between those electron beams at the merging unit. FIG. 7 illustrates an alternative injector arrangement 21 in which like components have been provided with like reference numerals. In the arrangement of FIG. 7, a first injector 30 is arranged to direct a first electron beam $E_1$ in the direction of a beam dump 34, while a second injector 31 is arranged to direct an electron beam $E_2$ in the direction of a second beam dump 37. Respective steering units 38, 39 are disposed between each injector 30, 31 and its respective beam dump 34, 37. Each respective steering unit 38, 39 is operable to selectively divert a received electron beam from its path towards a beam dump 34, 37 to a path towards a merging unit 33 disposed between the steering units 38, 39. The arrangement of FIG. 7 provides one example of an injector 21 in which the angles through which each electron beam $E_1$, $E_2$ is bent between its respective injector 30, 31 and the merging unit 33 are equal, thereby reducing a variance in charge distribution within the electron beams $E_1$, $E_2$ that may be caused by differing bending angles. The merging unit 33 switches between merging the first injected electron beam $E_1$ with the recirculating electron beam and merging the second injected electron beam $E_2$ with the recirculating electron beam. This may be achieved using dipole magnets with switchable polarity, for example in the manner described further below in connection with FIG. 11.

The steering units 38, 39 may be considered to operate in steering modes. In a first steering mode the first steering unit 38 directs the electron beam from the first injector 30 along a first path towards the beam dump 34. In a second steering mode the first steering unit 38 directs the electron beam from the first injector 30 towards the merging unit 33. In a third steering mode the second steering unit 39 directs the electron beam from the second injector 31 along a third path towards the beam dump 34. In a fourth steering mode the second steering unit 39 directs the electron beam from the second injector 31 towards the merging unit 33.

Figure 8:
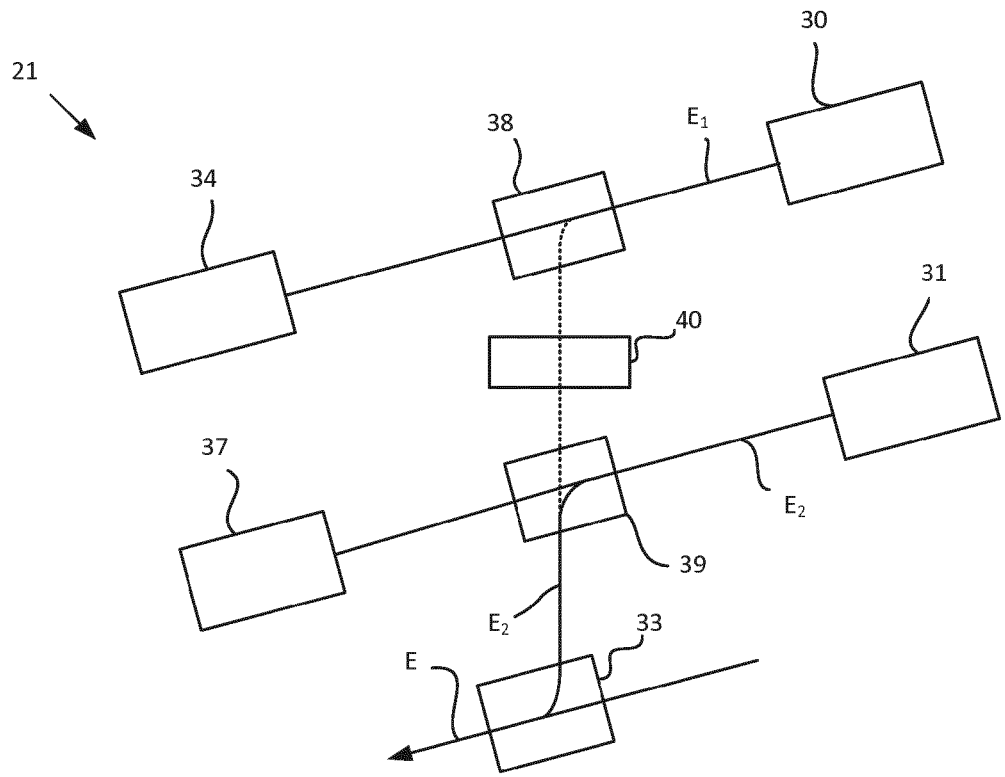
FIG. 8 is a schematic illustration of an injector arrangement according to an alternative embodiment of the invention.

FIG. 8 schematically illustrates an alternative injector arrangement 21 in which like components have been provided with like reference numerals. The arrangement of FIG. 8 generally corresponds to the arrangement of FIG. 6, having the same components in a generally similar layout. In the injector arrangement of FIG. 6, however, the direction at which the electron beams $E_1$, $E_2$ are emitted by the respective injectors 30, 31 is depicted as being substantially perpendicular to the direction of the electron beam E as it enters the merging unit 33. That is, in the arrangement of FIG. 6, the steering units 38, 39 are depicted as bending electron beams $E_1$, $E_2$ through an angle of 90 degrees. In contrast, in the arrangement of FIG. 8, the injectors 30, 31 and their respective beam dumps 34, 37 are each arranged at an angle with respect to the direction of propagation of the injected electron beam $E_1$, $E_2$ as it enters the merging unit 33 such that an angle through which the steering units 38, 39 need bend each electron beam $E_1$, $E_2$ to direct that electron beam to the merging unit 33 is less than 90 degrees. Similarly, in the arrangement of FIG. 8, the merging unit 33 is arranged to bend the injected electron beams $E_1$, $E_2$ through an angle of less than 90 degrees.

In the arrangement of FIG. 8, therefore, the total angle through which each electron beam $E_1$, $E_2$ is bent is reduced compared to the arrangement of FIG. 6, thereby reducing detrimental effects of variance in charge distribution within the electron beams.

While it is generally described above that one injector is operational at any time, in general more than one injector may be operational at the same time. For example, in the arrangement of FIG. 5, each injector 30, 31 may be operational at the same time. That is, the steering units 35, 36 may be arranged to simultaneously direct both of the electron beams $E_1$, $E_2$ to the merging unit 33, the electron beams $E_1$, $E_2$ together providing the electron beam E to be provided to the linear accelerator 22. Where both electron beams $E_1$, $E_2$ are provided to the merging unit 33 each injector 30, 31 may operate at a reduced repetition rate (that is may emit fewer electron bunches in a given period of time). For example, each of the injectors 30, 31 may operate at a repetition rate that is half that of the repetition rate of one injector operating alone. In this case, the electron beam E may comprise electron bunches from the first injector 30 interleaved with electron bunches from the second injector 31.

Although in described embodiments each injector arrangement comprises two injectors 30, 31, it will be appreciated that additional injectors may be provided (with the provision of corresponding additional steering arrangements where necessary). Additionally, although in the described embodiments each injector arrangement provides an electron beam to a merging unit (i.e. in an FEL configuration that may be referred to as an Energy Recovery LINAC (ERL) FEL), it is to be understood that where energy recovery is not used, the electron beams generated by the injector arrangement are not provided to a merger, but are provided directly to the LINAC 22 without being merged with an existing electron beam. In this case, an additional steering unit may be required to direct the electron beam E to the LINAC. Alternatively, the injector arrangement may be arranged such that the electron beam E is provided from the injector arrangement without the use of additional steering units.

As described above, each injector may comprise a photocathode arranged to generate electrons. The photocathode of each injector may be arranged to receive a beam of radiation from a radiation source such as a laser (referred to herein as a photocathode drive laser).

The photocathode of each injector may be held at a high voltage by using a voltage source. For example, a photocathode of an injector may be held at a voltage of approximately several hundred kilovolts. Photons of the laser beam are absorbed by the photocathode and may excite electrons in the photocathode to higher energy states. Some electrons in the photocathode may be excited to a high enough energy state that they are emitted from the photocathode. The high voltage of the photocathode is negative and thus serves to accelerate electrons which are emitted from the photocathode away from the photocathode, thereby forming a beam of electrons.

The laser beam provided by the photocathode drive laser may be pulsed such that electrons are emitted from the photocathode in bunches which correspond to the pulses of the laser beam. The photocathode drive laser may, for example, be a picosecond laser and thus pulses in the laser beam may have a duration of approximately a few picoseconds. The voltage of the photocathode may be a DC voltage or an AC voltage. In embodiments in which the voltage of the photocathode is an AC voltage the frequency and phase of the photocathode voltage may be matched with pulses of the laser beam such that pulses of the laser beam coincide with peaks in the voltage of the photocathode.

Figure 9:
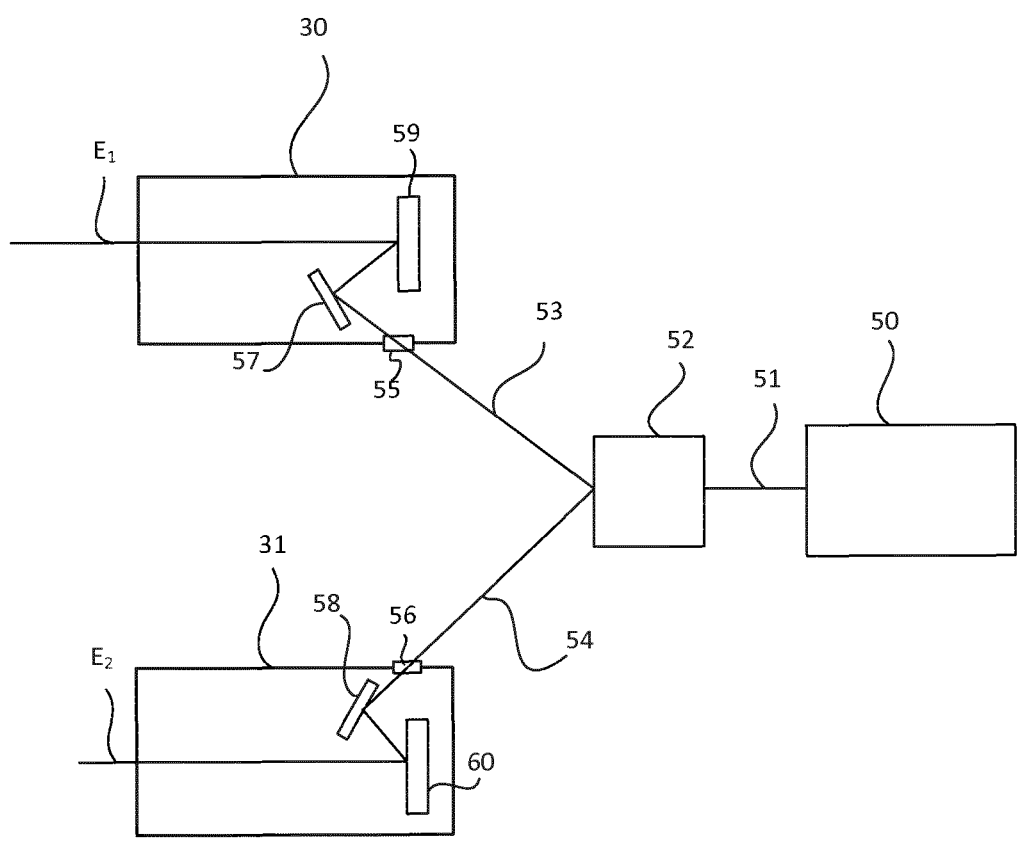
FIG. 9 is a schematic illustration of a drive mechanism for a plurality of injectors according to a further embodiment of the invention.

In some embodiments, a single photocathode drive laser may supply a laser beam to the photocathodes of multiple injectors. An example embodiment is schematically illustrated in FIG. 9, in which two injectors 30, 31 are driven by a single photocathode drive laser 50. The photocathode drive laser 50 is arranged to emit a pulsed laser beam 51 to a beam splitter 52. The beam splitter 52 is arranged to split the laser beam 51 into two pulsed laser beams 53, 54 directed to the injectors 30, 31 respectively. The pulsed laser beams 53, 54 enter the injectors 30, 31 through respective windows 55, 56 provided in a housing of the injectors 30, 31 and are incident upon respective mirrors 57, 58.

The mirror 57 of the first injector 30 is arranged to direct the pulsed laser beam 53 onto a first photocathode 59, while the mirror 58 of the second injector 31 is arranged to direct the pulsed laser beam 54 onto a second photocathode 60 causing the photocathodes 59, 60 to emit respective electron bunches $E_1$, $E_2$.

In order to operate one of the injectors 30, 31 in a standby mode, or to allow one of the injectors 30, 31 to be non-operational (e.g. for maintenance), the beam splitter 52 may be operable to selectively prevent laser radiation from being directed to either of the injectors 30, 31. The beam splitter 52 may be operable to independently vary the frequency with which pulsed laser beams are provided to the respective injectors 30, 31. For example, where the first injector 30 is operational and the second injector 31 is to be in a standby mode, the frequency with which pulsed radiation beams are provided to the second injector 31 may be lower than the frequency with which pulsed radiation beams are provided to the first injector 30.

Alternatively, the beam splitter 52 may always provide the pulsed laser radiation beams 53, 54 to both injectors equally. In this case, an injector may be placed into a standby mode by adjusting a voltage applied to the photocathode of the injector. For example, a voltage applied to a photocathode of a standby injector may be brought high less frequently than a voltage applied to a photocathode of an operational injector (thereby reducing the duty cycle of the standby injector).

It will be appreciated that FIG. 9 is merely schematic and that each injector may comprise more components than are illustrated. For example the photocathode of each injector may be housed within a vacuum chamber, and each injector may comprise an accelerating electric field.

Figure 10:
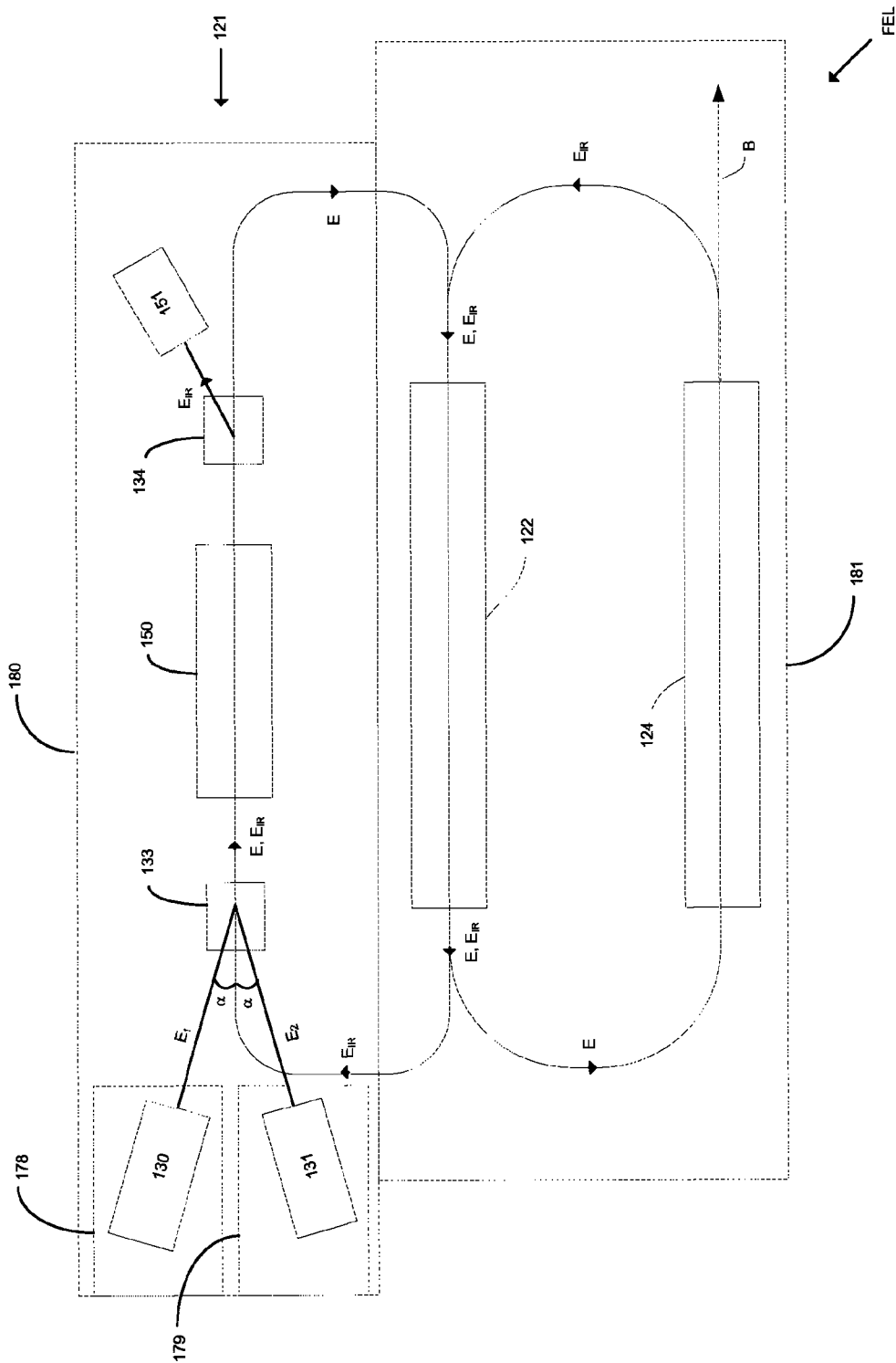
FIG. 10 is a schematic illustration of a free electron laser according to an embodiment of the invention.

FIG. 10 schematically shows a free electron laser FEL which comprises an injector arrangement 121, a linear accelerator 122 and an undulator 124. The injector arrangement 121 is provided in a first room 180 and the linear accelerator arrangement 122 and undulator 124 are provided in a second room 181. An EUV radiation beam B is output from the undulator 124 and may be provided to lithographic apparatuses (e.g. in the manner described above in connection with FIG. 1).

Figure 12:
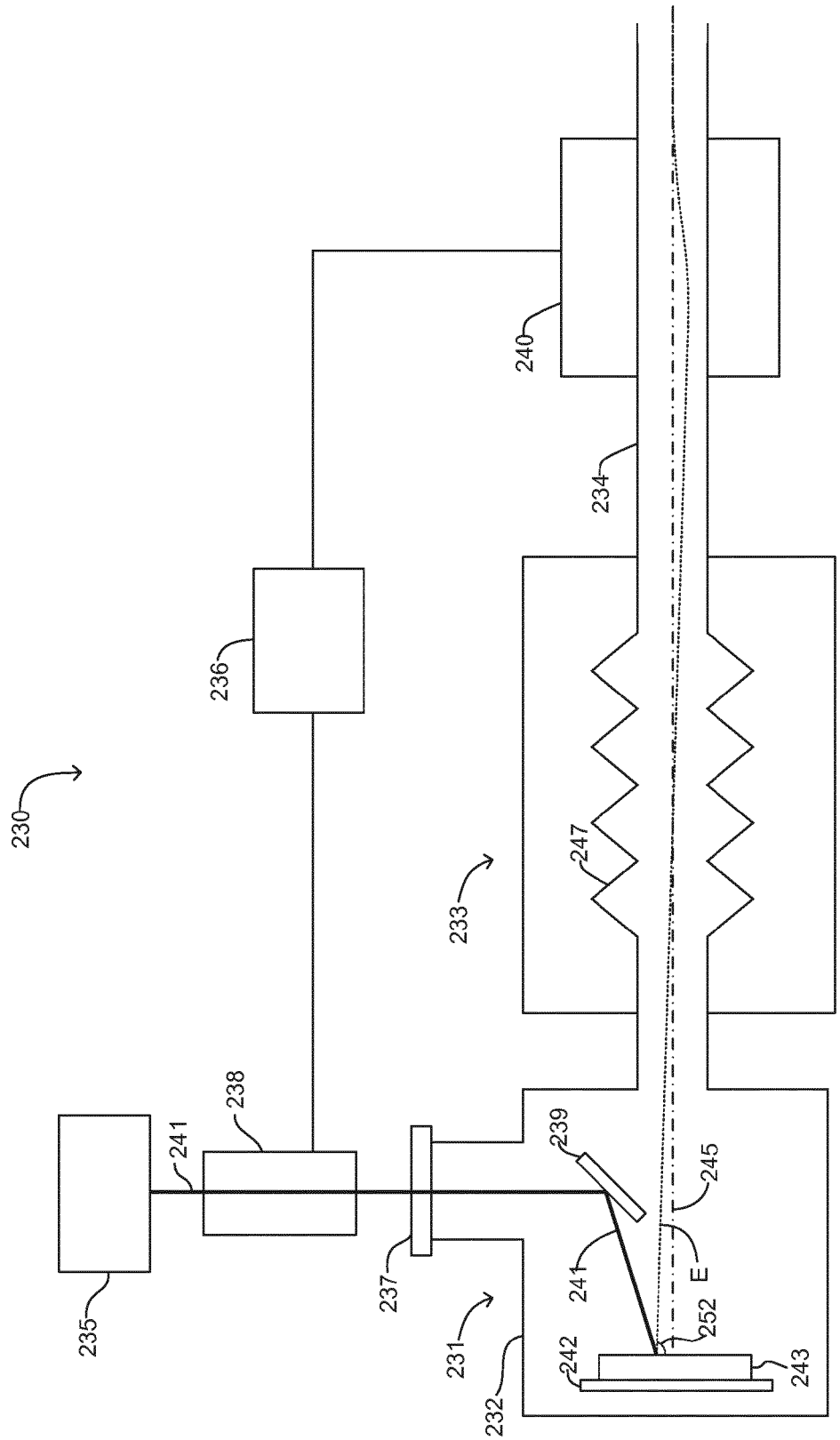
FIG. 12 is a schematic illustration of an electron injector according to an embodiment of the invention.

The injector arrangement 121 comprises a first injector 130 and a second injector 131. The first injector 130 is located in a first room 178 and the second injector 131 is located in a second room 179. Each injector 130, 131 comprises its own electron source such as, for example, a photocathode, and an accelerating electric field (e.g. as shown in FIG. 12). The accelerating electric field accelerates electrons generated by the electron source such that they leave the injector 130, 131 with an energy of for example around 10 MeV. The injectors 130, 131 generate electron beams $E_1$, $E_2$ which are directed towards a merging unit 133. The merging unit 133 merges the electron beams $E_1$, $E_2$ with a recirculating electron beam $E_{IR}$ (the origin of the recirculated electron beam $E_{IR}$ is described further below). Each injected electron beam $E_1$, $E_2$ subtends an angle α with respect to the recirculating electron beam $E_{IR}$ when it merges with the recirculating beam at the merging unit 133. The angle α may for example be around 30° or less, and may for example be around 15° or less.

In practice, during normal operation one of the injectors 130, 131 may be offline, e.g. operating in a standby mode or switched off to allow for routine maintenance. Thus, the recirculating electron beam $E_{IR}$ is merged with either the electron beam $E_1$ generated by the first injector 130 or the electron beam $E_2$ generated by the second injector 131. For ease of terminology the injected electron beam after the merging unit 133 is labelled as injected electron beam E (instead of injected electron beam $E_1$ or $E_2$).

A linear accelerator 150 forms part of the injector arrangement 121. The linear accelerator 150 accelerates the electrons of the injected electron beam E and increases their energy by at least 20 MeV. Since the electrons enter the linear accelerator 150 with an energy of around 10 MeV, they leave the linear accelerator with an energy of 30 MeV or more. The injector arrangement thus provides an electron beam E with an energy of 30 MeV or more. This electron beam E passes through an opening (not shown) out of the first room 180 and into the second room 181.

In the second room 181 the linear accelerator 122 accelerates the electrons of the electron beam E. The energy provided to the electrons by the linear accelerator 122 is significantly greater than the energy provided by the linear accelerator 150 of the injector arrangement 121. The energy provided by the linear accelerator 122 may for example be around 100 MeV or more). The accelerated electron beam E passes from the linear accelerator 122 to the undulator 124. In the undulator a radiation beam B is generated by the electron beam E in the manner described further above.

The linear accelerator 122 in the second room 181 may be referred to as the main linear accelerator 122 (or the second linear accelerator), and the linear accelerator 150 in the first room 180 may be referred to as the injector linear accelerator 150. The injector linear accelerator 150 and the main linear accelerator 122 may in an alternative arrangement be provided in the same room.

Accelerating the electron beam E after generation by the injector 130, 131 and before the electron beam travels to the main linear accelerator 122 is advantageous because it significantly improves the quality of electron bunches which are received by the main linear accelerator. The electron beam E may travel a substantial distance (e.g. in excess of 10 m) when travelling from the injector arrangement 121 to the main linear accelerator 122. If the electrons of the electron beam E were to have an energy of around 10 MeV, such as may be expected to be provided by an injector 130, 131, then significant degradation of the quality of electron bunches in the electron beam would occur as the electrons travelled to the main accelerator 122. The term 'quality' in this context may be interpreted as referring to the compactness of the electron bunch and the spread of electron energies within an electron bunch. The degradation occurs due to space charge effects. These space charge effects, which are examples of micro-bunch instability effects, are unavoidable. Accelerating the electron beam E using the injector linear accelerator 150 significantly increases the Lorentz factor of the electrons, and as a result the electrons have an increased mass as they travel from the injector arrangement 121 to the main linear accelerator 122. The increased mass of the electrons reduces the bunch degradation caused by space charge effects because the acceleration applied to the electrons due to space charge forces is reduced. The quality of the electron bunches is accordingly increased.

In an embodiment, if the energy of the electrons is increased from 10 MeV to 30 MeV or more then the mass of the electrons is approximately tripled or more than tripled. Electron beam bunch degradation is correspondingly reduced by two thirds or more. Some micro-bunch instability effects scale are reduced nonlinearly with respect to the Lorentz factor γ, and may for example reduce with a factor of $γ^2$ or with a factor of $γ^3$. These micro-bunch instability effects are thus reduced very substantially as the energy of the electrons is increased.

The injector linear accelerator 150 may provide significantly more than 20 MeV of energy to the electrons. It may for example provide 30 MeV or more. It may for example provide 50 MeV or more, or 60 MeV or more. The injector linear accelerator 150 may for example be provided as a module which is configured to provide 50 MeV or more, or 60 MeV or more. Alternatively, the injector linear accelerator 150 may be provided as half of such a module, which may be configured to provide 20 MeV or more, or 30 MeV or more. Providing more energy to the electron beam further reduces micro-bunch instability effects and thus further increases the quality of electron bunches that are received by the main accelerator 122.

It might be considered that instead of increasing the energy of the electrons in the electron beam E, the length of the path from the injectors to the main linear accelerator could simply be reduced. However, doing this may be problematic in practice, and large bending angles, e.g. in excess of 45° over short distances may be required. This may be the case for example when the injectors 130, 131 are located in different rooms 178, 179 from the main linear accelerator (this may be desirable to allow maintenance of an injector during operation of the free electron laser FEL). Large bending angles experienced by the electron beam E will cause the electrons to emit coherent synchrotron radiation. Coherent synchrotron radiation emitted by electrons at the front of an electron bunch will interact with electrons at the back of an electron bunch. The coherent synchrotron radiation thus disturbs the electron bunch and degrades its quality. The emission of coherent synchrotron radiation and interaction of that radiation with the electron bunch is another example of a micro-bunch instability effect.

When an embodiment of the invention is used, space charge instability effects experienced by the electrons of the electron beam E are very substantially reduced. This allows the length of the path from the injector arrangement 121 to the main linear accelerator 122 to be increased whilst incurring only a small reduction in the quality of electron bunches in the electron beam as a result of the length increase. Increasing the length of the path may allow the electron beam E to be bent more gradually (i.e. a longer path length is available to achieve a given change of direction of the electron beam). The change of electron beam direction may for example be achieved using a combination of dipole and quadrupole magnets. Providing a longer path length to accommodate the dipole and quadrupole magnets may allow them to be arranged such that they cause less synchrotron radiation to be emitted during the change of electron beam direction (compared with the amount of synchrotron radiation emitted during a change of electron beam direction when a shorter path length is available to accommodate the magnets).

Thus, by increasing the energy of the electrons in the electron beam and thereby increasing the Lorentz factor (and the mass) of the electrons, micro-bunch instability effects are reduced. The quality of electron bunches in the electron beam received by the main accelerator 122 is thereby improved.

The injector linear accelerator 150 is an energy recovery linear accelerator. That is, the injector linear accelerator 150 transfers energy from the recirculating electron beam $E_{IR}$ to the injected electron beam E. The recirculating electron beam $E_{IR}$ enters the injector linear accelerator 150 with a phase difference of around 180 degrees relative to accelerating fields in the injector linear accelerator (e.g. radio frequency fields). The phase difference between the electron bunches and the accelerating fields in the injector linear accelerator 150 causes the electrons of the recirculating electron beam $E_{IR}$ to be decelerated by the fields. The decelerating electrons pass some of their energy back to the fields in the injector linear accelerator 150 thereby increasing the strength of the fields which accelerate the injected electron beam E. In this way energy is transferred from the recirculating electron beam $E_{IR}$ to the injected electron beam E.

In an embodiment the recirculating electron beam $E_{IR}$ has an energy of 30 MeV, and the injector linear accelerator 150 transfers 20 MeV of energy from the recirculating electron beam to the injected electron beam E. Thus, an output electron beam E with an energy of 30 MeV and a recirculated electron beam $E_{IR}$ with an energy of 10 MeV are provided from the injector linear accelerator 150. The recirculated electron beam $E_{IR}$ is separated from the electron beam E by a demerging unit 134 and is directed to a beam dump 151.

Because the injector linear accelerator 150 is an energy recovery linear accelerator and transfers energy from the recirculated electron beam $E_{IR}$ to the injected electron beam E, it uses far less energy than would be the case if the linear accelerator was not an energy recovery linear accelerator. The injector linear accelerator 150 may have a balanced cavity load which is close to zero. That is, the current in the injected electron beam E may substantially match the current in the recirculated electron beam $E_{IR}$, and the energy extracted from the recirculated electron beam $E_{IR}$ may be almost the same as the energy given to the injected electron beam E. In practice, the amount of energy given to the injected electron beam E might be slightly higher than the energy extracted from the recirculated electron beam $E_{IR}$, in which case some energy is provided to the injector linear accelerator 150 to make up this difference. In general, the energy of the recirculated electron beam $E_{IR}$ when it leaves the injector linear accelerator 150 will substantially correspond with the energy of the electron beam $E_1$ provided by the first injector 130 (or equivalently the electron beam $E_2$ provided by the second injector 131).

As mentioned above, the injectors 130, 131 each include an accelerating electric field which accelerates the electrons before they reach the merging unit 133. The accelerating electric field is provided by a linear accelerator which uses the same operating principle as the injector linear accelerator 150 and the main linear accelerator 122, i.e. cavities are provided with a radio-frequency (RF) field which accelerates the electrons. However, an important difference between the acceleration provided within the injectors 130, 131 and subsequent acceleration is that that injection is not provided by an energy recovery linear accelerator. Thus, all of the energy required to accelerate the electrons before they reach the merging unit 133 must be provided to the injectors 130, 131 (none of the energy is recovered energy). For example, to accelerate the electrons to 10 MeV around 300 kW of power is needed. If the electrons were to be accelerated for example to 30 MeV by an injector 130, 131 then this would require around 900 kW of power. A disadvantage of providing such high power is that cryogenic cooling of the injector 130, 131 may become problematic. In addition, complications may arise when switching an injector 130, 131 on and off due to the magnitude of the load connected across the power supply.

Using the energy recovery injector linear accelerator 150 to accelerate the electrons to 30 MeV (or some other energy) avoids the above problems because the energy used to accelerate the electrons is recovered from the recirculated electron beam $E_{IR}$. An additional benefit of injecting the electron beam with a relatively low energy (e.g. 10 MeV or less) and then using the energy recovery injector linear accelerator 150 to accelerate the electron beam is that the recirculated electron beam $E_{IR}$ has an energy of 10 MeV or less after it has passed through the injector linear accelerator. This is energy is sufficiently low to avoid inducing radioactivity in the beam dump 151. If the injected electron beam had a significantly higher energy (e.g. 20 MeV) then an electron decelerating unit would need to be added before the beam dump 151 in order to avoid inducing radioactivity in the beam dump.

The main linear accelerator 122 is also an energy recovery linear accelerator. Energy recovery in the main linear accelerator 122 works in the same manner as energy recovery in the injector linear accelerator 150. After leaving the undulator 124 the electron beam E is recirculated through the main linear accelerator 122 with a phase difference of around 180 degrees. The electron beam then enters the injector arrangement 121 as the recirculating electron beam $E_{IR}$ which merges with an injected electron beam $E_1$, $E_2$.

The electron bunches of the electron beam E may be provided as sequences of bunches with gaps being provided between the sequences. The gaps may be referred to as clearing gaps and are longer than the separation between adjacent electron bunches of an electron bunch sequence. Ions are produced from residual gas in the electron beam path through collisional ionization. The ions are positively charged, and the rate of generation of the ions is such that over time the electron beam E would be neutralized (e.g. ion charge matches electron charge per meter of electron beam) if the ions were not removed. The clearing gaps in the electron beam E allow ions to drift away from the electron beam path, thereby preventing or reducing the accumulation of trapped ions. This drifting of ions away from the electron beam path may take place at any point along the beam path. Extraction electrodes may be provided which act to increase the speed at which ions drift away from the electron beam path.

As may be understood from considering FIG. 10, at some positions in the free electron laser the electron beam E and the recirculating electron beam $E_{IR}$ co-propagate with each other. This occurs between the merging unit 133 and the demerging unit 134, with the beams co-propagating through the injector linear accelerator 150 (it is this co-propagation which allows the energy recovery to happen in the linear accelerator). Similarly, the electron beam E and the recirculating electron beam $E_{IR}$ also co-propagate through the main linear accelerator 122.

In order for clearing gaps to be effective at locations where the electron beam E and the recirculating electron beam $E_{IR}$ co-propagate, the clearing gaps in the electron beam E should be synchronized with the clearing gaps in the recirculating electron beam $E_{IR}$. In addition to allowing ions to drift out of the electron beam path, synchronizing the clearing gaps as they pass through the injector linear accelerator 150 and the main linear accelerator 122 also provides the advantage that energy recovery operation of the accelerators is not disturbed (if a clearing gap were present in the decelerating beam without a corresponding clearing gap in the accelerating beam then the accelerator would cause an unwanted fluctuation in the energy of the accelerated electron beam).

In an embodiment, in order to allow synchronization of clearing gaps, the electron beam path length of the two loops shown in FIG. 10 may be equal to each other. The first loop may be measured from the merging unit 133, through the injector linear accelerator 150 and the main linear accelerator 122 back to the merging unit (without passing through the undulator 124). The second loop may be measured from entrance of the main linear accelerator 122, through the main linear accelerator and the undulator 124 and back to the entrance of the main linear accelerator 122. The rate at which the clearing gaps are generated may correspond with the time taken for electrons to travel around one of the loops (the travel time around the first loop will be the same as the travel time around the second loop). This will provide synchronization of the clearing gaps in the electron beam E and the recirculating electron beam $E_{IR}$, as a result of which ion clearance can take place throughout the electron beam path (including in the injector linear accelerator 150 and the main linear accelerator 122). In general, clearing gaps in the injected electron beam may be synchronized with clearing gaps in the recirculating electron beam.

Although FIG. 10 schematically shows the injector arrangement 121 as being in the same plane as the main linear accelerator 122 and the undulator 124, it is not necessary that this is the case. The injector arrangement 121 may be provided in a different plane. For example, the room 180 in which the injector arrangement is provided may be above or below the room 181 in which the main linear accelerator 122 and the undulator 124 are provided.

In general, each room 180-183 of the free electron laser FEL may have radiation shielding walls, floors and ceilings, such that radiation from outside that room is not incident upon an operator inside that room (and vice versa). This may allow for example an operator to repair one injector 130 whilst the other injector 131 is operating and other parts of the free electron laser FEL are operating.

Figure 11:
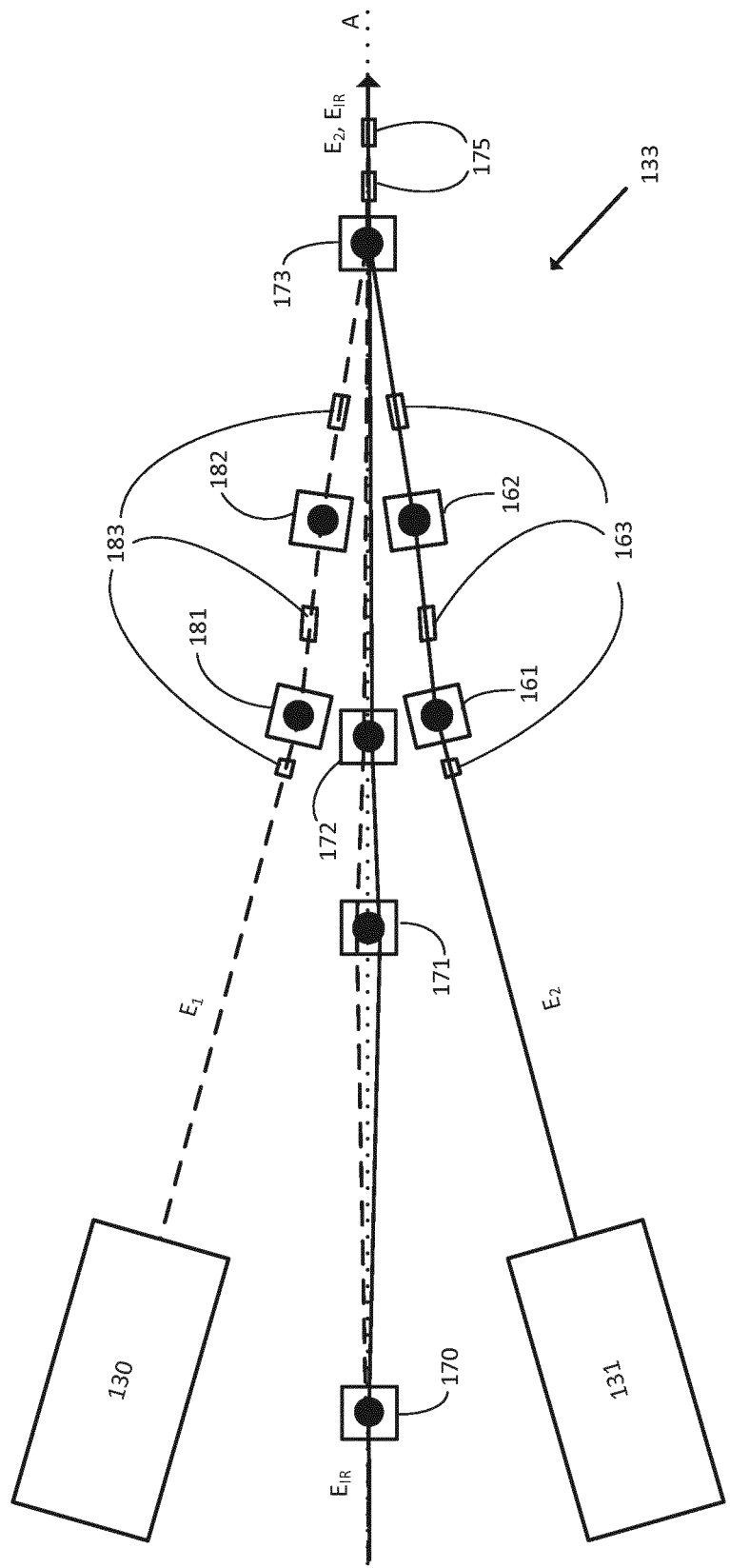
FIG. 11 is a schematic illustration of an injector arrangement which may form part of the free electron laser of FIG. 10.

FIG. 11 shows schematically in more detail the merging unit 133 together with the first and second injectors 130, 131 of the injector arrangement 121. In FIG. 11 the second injector 131 is operational and the first injector 130 is switched off (e.g. to allow for maintenance) or is in a standby mode. The merging unit 133 combines the injected electron beam $E_2$ with the recirculating electron beam $E_{IR}$ such that when these two electron beams leave the merging unit they propagate together in a collinear manner.

The merging unit 133 comprises dipole magnets and quadrupole magnets. In this embodiment the dipole magnets and the quadrupole magnets are electromagnets (although the dipole magnets and/or quadrupole magnets may be permanent magnets). The dipole magnets are schematically represented by squares containing discs 161, 162, 170-173, 181, 182. The dipole magnets change the direction of propagation of the electron beams (the point at which a change of direction occurs is represented schematically by a disc). Quadrupole magnets are indicated schematically by rectangles which do not contain discs 163, 183, 175. The quadrupole magnets act to keep the electron beams focused, i.e. to prevent unwanted divergence of the electron beam.

The injected electron beam $E_2$ and the recirculating electron beam $E_{IR}$ are combined by combining dipole magnet 173. As is schematically illustrated, the injected electron beam $E_2$ and the recirculating electron beam $E_{IR}$ have different orientations relative to an axis A of the injector arrangement (indicated by a dotted line). In this embodiment, the injected electron beam $E_2$ subtends an angle of for example around 15° relative to the axis A as it enters the combining dipole magnet 173. The recirculating electron beam $E_{IR}$ subtends an angle of for example around 2° relative to the axis A as it enters the combining dipole magnet 173. The injected electron beam has an energy of around 10 MeV, and the recirculating electron beam $E_{IR}$ has an energy of around 80 MeV in this example.

The combining dipole magnet 173 bends both of the electron beams $E_2$, $E_{IR}$ to the right as they pass through the combining dipole magnet. The bending angle which is applied to the electron beams $E_2$, $E_{IR}$ by the combining dipole magnet 173 is inversely proportional to the energy of the electron beams. The injected electron beam $E_2$, which has an energy of 10 MeV, is bent through an angle of around 15° such that when it exits the combining dipole magnet 173 it propagates in the direction of the axis A. The recirculating electron beam $E_{IR}$, which has a considerably higher energy of 80 MeV, is bent through an angle of around 2°. The bending angle of 2° is such that when the recirculating electron beam $E_{IR}$ exits the combining dipole magnet 173 it also propagates in the direction of the axis A. The spatial position of the injected electron beam $E_2$ on entering the combining dipole magnet 173 and the spatial position of the recirculating electron beam $E_{IR}$ on entering the dipole magnet are selected such that they both have the same spatial position on leaving the combining dipole magnet 173. The combining dipole magnet 173 thus combines the two electron beams such that on exiting the combining dipole magnet they both propagate along the axis A (they are collinear with each other).

The other dipole magnets 161, 162, 170-172 shown in FIG. 11 are configured to deliver the electron beams $E_2$, $E_{IR}$ to the combining dipole magnet 173 at angles and spatial positions relative to the axis A which are such that the electron beams will both propagate along the central axis when they leave the combining dipole magnet 173 (i.e. they will be collinear). Since the energies of the electron beams $E_2$, $E_{IR}$ are determined during design of the free electron laser, the general configuration of the dipole magnets may be selected accordingly when the free electron laser is being designed. The beam bending angles provided by the dipole magnets 161, 162, 170-173 may be tuned during installation of the injector arrangement 121 in order to provide beam alignment.

In addition to delivering the electron beams $E_2$, $E_{IR}$ to the combining dipole magnet 173 at desired angles and spatial positions relative to the axis A, the dipole magnets dipole magnets 161, 162, 170-172 may also be configured to maintain (or substantially maintain) electron bunch quality in the electron beams.

A pair of dipole magnets 161, 162 are provided in the path of the injected electron beam $E_2$. The first dipole magnet 161 is arranged to bend the injected electron beam $E_2$ to the right, and the second dipole magnet 162 is arranged to bend the injected electron beam $E_2$ to the left. After passing through the pair of dipole magnets 161, 162 the injected electron beam $E_2$ then passes through the combining dipole magnet 173, which bends the injected electron beam to the right. The injected electron beam $E_2$ thus passes through three dipole magnets 161, 162, 173. The injected electron beam E2 also passes through quadrupole magnets, which are provided before the first dipole magnet 161, between the first and second dipole magnets 161, 162 and after the second dipole magnet 162.

The dipole magnets 161, 162 are configured to deliver the injected electron beam $E_2$ to the combining dipole magnet 173 at a desired angle relative to the axis A (the desired angle may for example be 15°). Quadrupole magnets 163 are provided before the first dipole magnet 161, between the first and second dipole magnets 161, 162 and after the second dipole magnet 162. The quadrupole magnets 163 keep the injected electron beam $E_2$ focused, i.e. prevent unwanted divergence of the injected electron beam. In combination, the three dipole magnets 161, 162, 173 and three quadrupole magnets 163 provide bending of the injected electron beam $E_2$ which is substantially achromatic, i.e. the position and direction of the electron beam after the combining dipole magnet 173 is independent of the energy of the injected electron beam $E_2$. The dipole magnets 161, 162, 173 and quadrupole magnets 163 also provide bending of the injected electron beam $E_2$ which is substantially isochronous, i.e. all energies of electrons travel along the same path length. Some tuning of the dipole magnets 161, 162, 173 and quadrupole magnets 163 may be performed during installation in order to obtain an electron beam with a desired bunch quality. The tuning may for example take into account the quality of the electron bunches after the injector linear accelerator 150. In some instances, the best electron bunch quality after the injector linear accelerator 150 may be achieved by deliberately introducing, for example, a small amount of chromaticity into the injected electron beam E2 using the dipole magnets 161, 162, 173 and quadrupole magnets 163. In general, the dipole magnets 161, 162, 173 and quadrupole magnets 163 may be tuned to provide electron bunches with a desired quality after the linear accelerator 150.

The injected electron beam $E_2$ may travel along a solenoid (not shown) before it reaches the first quadrupole magnet 163. The solenoid may pass through a wall of a room 179 in which the second injector 131 is located (see FIG. 10).

The recirculated electron beam $E_{IR}$ passes through four dipole magnets 170-173. These dipole magnets 170-173 have reversible polarity. That is, the bending angle which is applied to the recirculated electron beam $E_{IR}$ by each dipole magnet 170-173 may be reversed. This is achieved by switching the direction of current which flows through the dipole magnets 170-173, thereby swapping the B-field direction of those dipole magnets.

When the second injector 131 is operating and the first injector 130 is switched off (or in standby mode), the dipole magnets 170-173 are configured such that the recirculating electron beam $E_{IR}$ follows the path indicated schematically by the solid line in FIG. 11. That is, the first dipole magnet 170 bends the recirculating electron beam $E_{IR}$ to the right, the second dipole magnet 171 bends the recirculating electron beam $E_{IR}$ to the left, and the third dipole magnet 172 bends the recirculating beam to the right. In this example, the dipole magnets 170-172 deliver the recirculating electron beam $E_{IR}$ to the combining dipole magnet 173 at an angle of around 2° relative to the axis A. The dipole magnets 170-173 are arranged as a chicane. The chicane delivers the recirculating electron beam $E_{IR}$ to the combining dipole magnet 173 at a desired angle such that the recirculating electron beam is directed along the axis A when it leaves the combining dipole magnet.

As noted above, the angles of incidence of the injected electron beam $E_2$ and the recirculating electron beam $E_{IR}$, and their respective energies, are such that they both propagate along the axis A when they leave the combining dipole magnet 173. The injected electron beam $E_2$ and the recirculating electron beam $E_{IR}$ pass through quadrupole magnets 175 and then travel to the injector linear accelerator 150 (see FIG. 10).

It may be desired to switch off the second injector 131 and use the first injector 130 to provide an electron beam $E_1$ for the free electron laser (i.e. switch between a second mode of operation and a first mode of operation). Where this is the case, the polarities of the dipole magnets 170-173 which act upon the recirculating electron beam $E_{IR}$ are all switched. This may be achieved by switching the direction of current flowing through the dipole magnets 170-173. The recirculating electron beam $E_{IR}$ then follows the beam path indicated by the dashed line. This is effectively a mirror image of the path followed by the recirculating electron beam $E_{IR}$ when the second injector 131 was being used (reflected about the axis A). Thus, the recirculating electron beam $E_{IR}$ is bent to the left by the first dipole magnet 170, is then bent to the right by the second dipole magnet 171, and is then bent to the left by the third dipole magnet 172. The recirculating electron beam is thereby delivered to the combining dipole magnet 173 at an angle of around 2°, but from an opposite side of the axis A.

Similarly, the injected electron beam $E_1$ follows a path which is also indicated by a dashed line. The injected electron beam $E_1$ passes through two dipole magnets 181, 182 and three quadrupole magnets 183. These magnets operate in a manner which corresponds with that described above in relation to the other injected electron beam $E_2$, and deliver the injected electron beam $E_1$ to the combining dipole magnet 173 at an angle of around 15°, but from an opposite side of the axis A.

The energies and incidence angles of the injected electron beam $E_1$ and the recirculating electron beam $E_{IR}$ are such that the combining dipole magnet 173 applies different degrees of bending to the electron beams, and they both propagate collinearly along the axis A when they leave the combining dipole magnet.

The above description refers to incidence angles of around 15° for the injected electron beams $E_1$, $E_2$ and incidence angles of around 2° for the recirculating electron beam $E_{IR}$. However, it will be appreciated that any suitable angles may be used (e.g. incidence angles of up to around 30° for the injected electron beams $E_1$, $E_2$, and incidence angles of up to around 4° for the recirculating electron beam $E_{IR}$). As noted above, the degree of bending which is applied by the combining dipole magnet 173 is inversely proportional to the energy of the electron beam. Thus, when configuring the injector arrangement 121 the configurations of the dipole magnets 161, 162, 170-173, 181, 182 may be selected using the electron beam energies that will be present when the injector arrangement 121 is operational (the energies of the electron beams will be known in advance).

Referring again to FIG. 10, it may be seen that the injected electron beam $E_2$ appears to cross the recirculating electron beam $E_{IR}$ upstream of the merging unit 133. In practice the electron beams do not intersect, but instead the injected electron beam $E_2$ passes above the recirculating electron beam $E_{IR}$. Dipole magnets are used to move the recirculating electron beam $E_{IR}$ upwards after it has passed underneath the injected electron beam $E_2$, such that both beams are propagating in the same plane before they enter the merging unit 133. The plane of injected electron beam $E_2$ and the recirculating electron beam $E_{IR}$ may correspond with the plane of the merged electron beam E, $E_{IR}$ after the merging unit 133. The plane may for example be substantially horizontal. In an alternative arrangement the injected electron beam $E_2$ may pass beneath the recirculating electron beam $E_{IR}$ before the merging unit 133.

Switching between the first mode of operation, in which the injected electron beam $E_1$ provided from the first injector 130 is combined with the recirculating electron beam $E_{IR}$, to the second mode of operation in which the injected electron beam $E_2$ provided from the second injector 131 is combined with the recirculating electron beam, may be controlled by a controller (not shown). The controller may comprise a processor. The controller may switch the polarity of the dipole magnets 170-173 of the chicane by switching the direction of current provided to the dipole magnets.

FIG. 12 is a schematic depiction of an embodiment of an injector 230. The injector 230 comprises an electron gun 231 (which may be considered to be an electron source), an electron booster 233 and a steering unit 240. The electron gun 231 comprises a support structure 242 which is arranged to support a photocathode 243 inside a vacuum chamber 232. It should be appreciated that in industry an injector 230 may be sold without a photocathode 243 which may be considered as a replaceable part for use in the injector 230.

The electron gun 231 is configured to receive a beam of radiation 241 from a radiation source 235. The radiation source 235 may, for example, comprise a laser 235 which emits a laser beam 241. The laser 235 may be referred to as a photocathode drive laser. The laser beam 241 is directed through a laser beam adjustment unit 238 and into the vacuum chamber 232 through a window 237. The laser beam 241 is reflected by a mirror 239 such that it is incident on the photocathode 243. The mirror 239 may, for example, be metallised and connected to ground in order to prevent the mirror 239 from becoming electrically charged.

The laser beam adjustment unit 238, the window 237 and the mirror 239 may all be considered to be components of a beam delivery system which directs the laser beam 241 onto a region of the photocathode 243. In other embodiments the beam delivery system may comprise more or fewer components than the laser beam adjustment unit 238, the window 237 and the mirror 239 and may comprise other optical components. The beam delivery system may comprise any components suitable for directing the laser beam 241 onto a region of the photocathode 243. For example, in some embodiments the beam delivery system may consist only of a support configured to support a laser 235 such that a laser beam 241, emitted by the laser 235, is directed onto a region of the photocathode 243.

The photocathode 243 may be held at a high voltage by using a voltage source (not shown) which may form part of the electron gun 232 or may be separate from the electron gun 232. For example, the photocathode 243 may be held at a voltage of approximately several hundred kilovolts. Photons of the laser beam 241 are absorbed by the photocathode 243 and may excite electrons in the photocathode 243 to higher energy states. Some electrons in the photocathode 243 may be excited to a high enough energy state that they are emitted from the photocathode 243. The high voltage of the photocathode 243 is negative and thus serves to accelerate electrons which are emitted from the photocathode 243 away from the photocathode 243, thereby forming a beam of electrons E.

As mentioned further above, the laser beam 241 may be pulsed such that electrons are emitted from the photocathode 243 in bunches which correspond to the pulses of the laser beam 241. The electron beam E is therefore a bunched electron beam. The laser 235 may, for example, be a picosecond laser and thus pulses in the laser beam 241 may have a duration of approximately a few picoseconds. The voltage of the photocathode 243 may be a DC voltage or an AC voltage. In embodiments in which the voltage of the photocathode 243 is an AC voltage the frequency and phase of the photocathode voltage may be matched with pulses of the laser beam 241 such that pulses of the laser beam 241 coincide with peaks in the voltage of the photocathode 243.

The amount of radiation emitted from the free electron laser FEL is at least in part dependent on a peak current of the electron beam E in the undulator 24. In order to increase the peak current of an electron beam E in the undulator 24 and therefore increase the amount of radiation which is emitted from the free electron laser FEL, it may be desirable to increase the peak current of electron bunches which are emitted from the photocathode 243. For example, it may be desirable for the photocathode 243 to emit electron bunches having a peak current exceeding 1 milliamp.

The number of electrons which are emitted by the photocathode 243 per photon from the laser beam 241 is known as the photocathode's quantum efficiency. It may be desirable for the photocathode 243 to comprise a material having a high quantum efficiency such that an electron beam E having a large peak current (e.g. a peak current of greater than 1 milliamp) is emitted from the photocathode 243 for a given number of photons of the laser beam 241. The photocathode 243 may, for example, comprise one or more alkali metals and may comprise a compound containing one or more alkali metals and antimony. For example, the film of material 63 may comprise sodium potassium antimonide. Such a photocathode 243 may, for example, have a quantum efficiency of a few percent. For example the photocathode 243 may have a quantum efficiency of approximately 5% (this may be considered to be a high quantum efficiency).

The vacuum chamber 232 extends from the electron gun 231 and through the electron booster 233, thus forming a beam passage 234 through which the electron beam E travels. The beam passage 234 extends about an axis 245. In an embodiment in which the electron beam E is delivered directly to a linear accelerator which does not use energy recovery, the axis 245 may correspond with the desired path of the electron beam E through the linear accelerator 22, and may be the axis about which the electrons follow an oscillating path in the undulator 24 (as was described above). In an embodiment in which the electron beam E is delivered via a merging unit to join a recirculating electron beam, the axis 245 may correspond with a desired path of the electron beam E on leaving the injector 230 (the desired path being such that the electron beam will be delivered by dipole magnets to the merging unit with a desired incidence angle).

The axis 245 may coincide with the geometric centre of the beam passage 234 and/or the geometric centre of the photocathode 243. In alternative embodiments the axis 245 may be separated from the geometric centre of the beam passage 234 and/or the geometric centre of the photocathode 243. In general the axis 245 is the axis with which it is desirable that the electron beam E is substantially coincident after the electron beam has passed through the steering unit 240.

Electrons in an electron bunch emitted from the photocathode 243 are each repelled away from each other by repulsive electrostatic forces which act between the electrons. This is the space charge effect and may cause the electron bunch to spread out. The spread of an electron bunch in position and momentum phase space may be characterised by the emittance of the electron beam E. Spreading out of electron bunches due to the space charge effect increases the emittance of the electron beam E. It may be desirable for the electron beam E to have a low emittance in the linear accelerator 22, 122, 150 and the undulator 24, 124 (see FIGS. 3 and 10) since this may increase the efficiency with which energy from the electrons is converted to radiation in the undulator 24.

In order to limit an increase in the emittance of the electron beam E the electron beam is accelerated in the electron booster 233. Accelerating an electron bunch in the electron booster 233 reduces the spread of the electron bunch caused by the space charge effect. It is advantageous to accelerate the electron beam E (using the electron booster 233) close to the photocathode 243 before the emittance of the electron beam E increases substantially due to the space charge effect.

The electron booster 233 may, for example, accelerate electron bunches to energies in excess of approximately 0.5 MeV. In some embodiments the electron booster 233 may accelerate electron bunches to energies in excess of approximately 5 MeV. In some embodiments the electron booster 233 may accelerate electron bunches to energies of up to approximately 10 MeV. The electron booster 233 may for example accelerate electron bunches to an energy of around 10 MeV.

In some embodiments the electron booster 233 may be positioned downstream of the steering unit 240 as opposed to upstream of the steering unit 240 as depicted in FIG. 12.

The electron booster 233 operate in the same manner the linear accelerator 22 described above and may, for example, comprise a plurality of radio frequency cavities 247 (depicted in FIG. 12) and one or more radio frequency power sources (not shown). The radio frequency power sources may be operable to control electromagnetic fields along the axis 245 of the beam passage 234. As bunches of electrons pass between the cavities 247, the electromagnetic fields controlled by the radio frequency power sources cause each bunch of electrons to accelerate. The cavities 247 may be superconducting radio frequency cavities. Alternatively, the cavities 247 may be conventionally conducting (i.e. not superconducting), and may be formed from, for example, copper. The electron booster 233 may comprise a linear accelerator.

In an alternative embodiment the electron booster 233 may, for example, comprise a laser accelerator, wherein the electron beam E passes through a focused laser beam and the electric field of the laser beam causes the electrons to accelerate. Other types of electron boosters may also be used.

The electron beam E travels along the beam passage 234, and passes either to a merging unit 33, 133 (when a LINAC is used) or directly to a linear accelerator (when a non-energy recovering linear accelerator is used). The beam passage 234 is pumped to vacuum pressure conditions but may contain some residual gas molecules. The electron beam E may collide with residual gas molecules and may ionize the gas molecules, thereby creating positively charged ions. The energy of the electrons increases when they are accelerated, and this increased energy result in more ions being created.

Positively charged ions throughout the free electron laser FEL are attracted to the path of the electron beam E whose negative charge acts as a potential well to the positively charged ions. The ions have a substantially higher mass than electrons and as a result are not accelerated for example by cavities 247 of the electron booster 233. The ions will diffuse along the beam passage 234 and may, for example, travel back into the injector 230. Ions reaching the injector 230 are attracted to the photocathode 243 due to the voltage of the photocathode 243 and may collide with the photocathode 243.

The positive ions travelling back to the injector 230 will travel along the path of the electron beam E. The last portion of the path travelled by the ions towards the injector will be linear (e.g. corresponding with the path between the injector 130 and the quadrupole magnet 183 shown in FIG. 11). This linear path may for example pass through a wall of a room containing the injector 130. The linear path may be located within a solenoid. The linear path travelled by the positive ions may correspond with the axis 245 shown in FIG. 12.

Ion collisions with the photocathode 243 may damage the photocathode 243. In particular, the collision of ions with the photocathode 243 may cause sputtering of material from the photocathode 243. Damage to the photocathode 243 may cause a change in composition of the photocathode 243 which may reduce the quantum efficiency of the photocathode 243 and therefore reduce the peak current of the electron beam E which is emitted from the photocathode 243. Additionally or alternatively damage of the photocathode 243 by ion collisions may cause an increase in the surface roughness of the photocathode 243. An increase in the surface roughness of the photocathode 243 may lead to an increase in the emittance of the electron beam E which is emitted from the photocathode 243 and/or may lead to a reduction in the quantum efficiency of the photocathode 243. Ion collisions with the photocathode 243 may therefore, over time, reduce the peak current of the electron beam E and/or increase the emittance of the electron beam E.

In addition to the effects of ion collisions with the photocathode 243, the laser beam 241, may cause damage to the region of the photocathode 243 which is illuminated by the laser beam 241. Similarly to the effects of ion collisions, the laser beam 241 may cause an increase in surface roughness and/or a change in composition of the photocathode 243 which may decrease the quantum efficiency of a region of the photocathode 243 which is illuminated by the laser beam 241 and may increase the emittance of an electron beam E emitted from that region.

Damage to the photocathode 243 caused by ion collisions and/or the laser beam 241, may reduce the useful lifetime of a photocathode. It may therefore be desirable to reduce the damage to the photocathode 243 and/or to reduce the impact of the damage to the photocathode 243 on the peak current and the emittance of the electron beam E emitted from the photocathode 243. This may increase the useful lifetime of the photocathode 243.

Figure 13:
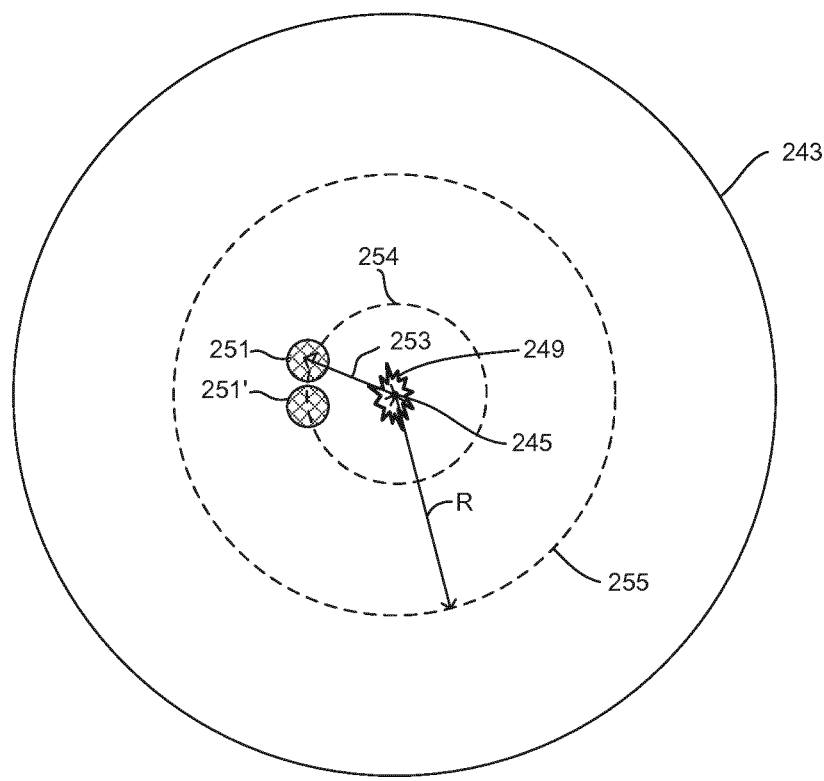
FIG. 13 is a schematic illustration of a photocathode for use in the electron injector of FIG. 12.

FIG. 13 is a schematic depiction of the photocathode 243 as viewed along the axis 245. As mentioned above, the ions become aligned with the electron beam E due to the potential well caused by the electron beam E. The path of the electron beam E may generally be substantially coincident with the axis 245 during passage from the injector 230. In the event that these ions enter the injector 230 and collide with the photocathode 243 they will therefore collide with the photocathode 243 close to the position at which the axis 245 meets the photocathode 243. The majority of the ions which collide with the photocathode 243 may therefore impact the photocathode 243 in an impact region 249 (shown in FIG. 13) surrounding the axis 245 (which may correspond with the geometric centre of the photocathode).

Ion collisions in the impact region 249 may alter the composition of the photocathode 243 and/or increase the surface roughness of the photocathode 243 in this region 249. An electron beam E which is emitted from the impact region 249 may therefore have a lower peak current (due to a reduced quantum efficiency in the impact region 249) and/or a higher emittance than an electron beam E which is emitted from a region of the photocathode 243 other than the impact region 249. In order to increase the peak current and/or to reduce the emittance of the electron beam E, the laser beam 241 may be directed to be incident on an illuminated region 251 of the photocathode 243 which is separated from the axis 245 and from the impact region 249. For example, the illuminated region 251 may be separated from the axis 245 by a distance of approximately a few millimeters. Relatively few ions collide with the illuminated region 251 since it is separated from the axis 245. The composition and surface roughness of the illuminated region 251 may not therefore be substantially reduced by ion collisions with the photocathode 243 and thus an electron beam E with a high peak current and low emittance may be emitted from the illuminated region 251.

Directing the laser beam 241 to be incident on an illuminated region 251 of the photocathode 243 which is separate from the axis 245 causes the position of the electron beam E which is emitted from the illuminated region 251 to be shifted from the axis 245 by a positional offset 253. When the electron beam E is emitted from the photocathode 243 at a position separated from the axis 245, the electric field associated with the photocathode 243 may cause the electron beam E to be emitted at an angle 252 which is not perpendicular with the surface of the photocathode as is shown in FIG. 12. For example in embodiments in which the geometric centre of the photocathode 243 coincides with the axis 245, only electrons which are emitted substantially at the axis 245 are emitted in a direction which is perpendicular to the surface of the photocathode 243. The electron beam E may therefore be emitted with a positional displacement 253 and an angular displacement 252 from the axis 245.

Subsequent components of the injector arrangement (e.g. a merging unit or a linear accelerator) may be configured to accelerate an electron beam E whose position and trajectory is substantially coincident with the axis 245. It may therefore be desirable to alter the trajectory of the electron beam E in order to correct for the positional displacement 253 and the angular displacement 252 from the axis 245 such that the electron beam E is substantially coincident with the axis 245 upon leaving the injector 230.

In order to align the electron beam E with the axis 245 the electron beam E is adjusted with a steering unit 240 (shown in FIG. 12). The steering unit 240 is configured to alter the trajectory of the electron beam E such that the electron beam E trajectory is substantially coincident with the axis 245 upon leaving the steering unit 240. The steering unit 240 may, for example, comprise one or more electromagnets configured to generate a magnetic field in the beam passage 234. The magnetic field may exert a force on the electron beam E which acts to alter the trajectory of the electron beam E. In the embodiment depicted in FIG. 12 the trajectory of the electron beam is altered by the steering unit 240 until the electrons become substantially coincident with the axis 245.

In embodiments in which the steering unit comprises one or more electromagnets, the electromagnets may be arranged to form one or more of a magnetic dipole, a magnetic quadrupole, a magnetic sextupole and/or any other kind of multipole magnetic field arrangement configured to apply a force to the electron beam E. The steering unit 240 may additionally or alternatively comprise one or more electrically charged plates, configured to create an electric field in the beam passage 234 such that a force is applied to the electron beam E. In general the steering unit 240 may comprise any apparatus which is operable to apply a force to the electron beam E to alter its trajectory so that the electrons are coincident with the axis 245.

The mass to charge ratio of any ions which pass through the steering unit 240 is much larger than the mass to charge ratio of electrons in the electron beam E. The steering unit 240 does not therefore substantially adjust the position or direction of travel of ions which pass through the steering unit 240 towards the photocathode 243. Ions passing into the injector 230 (e.g. from the linear accelerator 22) may have enough momentum that the potential well created by the electron beam E in the injector 230 does not substantially alter the path of the ions in the injector 230. This has the effect of separating the path of ions (which may be substantially coincident with the axis 245) from the electron beam E in the injector 230 and allows the position of the impact region 249 on the photocathode 243 to be separated from the region 251 of the photocathode 243 which is illuminated by the laser beam 241. This ensures that the illuminated region 251 of the photocathode 243 from which the electron beam E is emitted is separated from the impact region 249 which is prone to damage from ion collisions. This may ensure that ion collisions with the photocathode 243 do not substantially reduce the peak current or increase the emittance of the electron beam E.

However as was mentioned above the laser beam 241 which is incident on the photocathode 243 may damage the region of the photocathode 243 which is illuminated by the laser beam 241 over time and may reduce the peak current and/or increase the emittance of the electron beam E which is emitted from the photocathode 243. In addition to damage of the region 251 of the photocathode 243 which is illuminated by the laser beam 241 which is caused by the laser beam 241, the illuminated region 251 may also be damaged by ions which are created in the injector 230 by collisions between gas molecules and electrons which have not yet passed through the steering unit 240. Ions created before the steering unit 240 may be attracted to the path of the electron beam E before the steering unit 240 and may therefore diffuse along the path of the electron beam E to collide with the region 251 of the photocathode 243 which is illuminated by the laser beam 241. However, in general fewer ions are created in the injector 230 than at positions downstream of the injector and therefore ion damage to the region 251 of the photocathode 243 which is illuminated by the laser beam 241 may be less significant than ion damage to the impact region 249.

In order to increase the useful lifetime of the photocathode 243, the region 251 of the photocathode 243 which is illuminated by the laser beam 241 may be changed. For example, after a period of time during which the laser beam is incident on the illuminated region 251, during which the illuminated region 251 may have become damaged, the position of the laser beam 241 on the photocathode may be changed to a new illuminated region 251' (as shown in FIG. 13). The laser beam 241 may be incident on the new illuminated region 251' for a further period of time until the new illuminated region 251' becomes damaged. The region of the photocathode 243 which is illuminated by the laser beam 241 may then again be changed to a further new illuminated region (not shown). The position of the region of the photocathode 243 which is illuminated by the laser beam 241 may be recurrently changed, thereby scanning the laser beam 241 over the photocathode 243, in order to illuminate new regions of the photocathode 243 which have not previously been illuminated and therefore damaged.

This may allow a large region of the photocathode 243 to be used to emit the electron beam E over the lifetime of the photocathode 243 and may therefore increase the total useful lifetime of the photocathode 243. Changing the region of the photocathode 243 which is illuminated by the laser beam 241 may, for example, allow the useful lifetime of the photocathode 243 to be increased by a factor of 10 or more.

The region of the photocathode 243 which is illuminated by the laser beam 241 may be changed continuously or may be changed in steps. In an embodiment in which the region of the photocathode 243 which is illuminated by the laser beam 241 is changed in steps, the steps may occur periodically. In an alternative embodiment the steps may occur non-periodically.

The region of the photocathode 243 which is illuminated by the laser beam 241 may, for example, be changed by a laser beam adjustment unit 238 (shown in FIG. 12). The laser beam adjustment unit 238 may comprise one or more mirrors, lenses or other optical components suitable for changing one or more properties of the laser beam 241. For example the laser beam adjustment unit 238 may change the direction of propagation of the laser beam 241 such that the position at which the laser beam 241 is incident on the mirror 239 and the position at which the laser beam 241 is incident on the photocathode 243 is changed.

In an alternative embodiment the region of the photocathode 243 which is illuminated by the laser beam 241 may be changed by altering the position and/or the orientation of the mirror 239. For example, the mirror 239 may be tilted and/or moved in order to alter the direction in which the laser beam 241 is reflected from the mirror 239, thereby changing the region of the photocathode 243 which is illuminated by the laser beam 241. The position and/or the orientation of the mirror 239 may be changed using an actuator (not shown) which is operable to change the position and/or the orientation of the mirror 239.

In a further alternative embodiment the region of the photocathode 243 which is illuminated by the laser beam 241 may be changed by altering the position and/or the orientation of the laser 235. For example the laser 235 may be tilted and/or moved in order to change the region of the photocathode 243 which is illuminated by the laser beam 241. The position and/or the orientation of the laser 235 may be changed by an actuator (not shown) which is operable to change the position and/or the orientation of the laser 235.

In a still further embodiment the region of the photocathode 243 which is illuminated by the laser beam 241 may be changed by altering the position and/or the orientation of the photocathode 243. For example, the photocathode 243 may be rotated whilst the position of the laser beam 241 remains constant such that the region of the photocathode 243 which is illuminated by the laser beam 241 rotates on the photocathode 243. Alternatively both the position and/or the orientation of the photocathode 243 and the laser beam 241 may be altered in order to change the region of the photocathode 243 which is illuminated by the laser beam 241.

The position and/or the orientation of the photocathode 243 may be changed by an actuator (not shown). For example, the support structure 242 may comprise an actuator which is operable to change the position and/or the orientation of the photocathode 243.

A laser beam adjustment unit 238, an actuator operable to change the position and/or the orientation of the mirror 239, an actuator operable to change the position and/or the orientation of the laser 235 and an actuator operable to change the position and/or the orientation of the photocathode 243 are all examples of adjustment mechanisms operable to change the region of the photocathode 243 which is illuminated by the laser beam 241. It will be appreciated that other adjustment mechanisms may be used to change the region of the photocathode 243 which is illuminated by the laser beam 241 without departing from the scope of the invention. Each adjustment mechanism may be used separately or in combination with one or more other adjustment mechanisms for changing the region of the photocathode 243 which is illuminated by the laser beam 241.

The region of the photocathode 243 which is illuminated by the laser beam 241 may determine the angular displacement 252 and the positional displacement 253 of the electron beam E from the axis 245. A change of the region of the photocathode 243 which is illuminated by the laser beam 241 may therefore cause a corresponding change in the angular and/or positional displacement from the axis 245. In response to a change of the region of the photocathode 243 which is illuminated by the laser beam 241, the steering unit 240 may adjust the force which is applied to the beam of electrons E such that the trajectory of the electron beam E is altered from its adjusted angular and positional displacement so that the electron beam E continues to be coincident with the axis 245 after the adjustment. The steering unit 240 may therefore be operable to adjust the force which is applied to the beam of electrons E in response to the region of the photocathode 243 which is illuminated by the laser beam 241.

In an embodiment in which the steering unit 240 comprises one or more electromagnets the steering unit 240 may adjust one or more electrical currents which flow through coils of the one or more electromagnets. An adjustment to the one or more electrical currents may cause a change in the magnetic field which is generated by the steering unit 240 and therefore change the force which is applied to the electron beam E by the steering unit 240.

In an alternative embodiment the steering unit 240 may be mechanically moveable. For example, the steering unit 240 may be tilted, rotated and/or shifted in order to adjust the force which is applied to the electron beam E in response to a change of the region of the photocathode 243 which is illuminated by the laser beam 241.

The steering unit 240 may be controlled by a controller 236 (shown in FIG. 12). The controller 236 may additionally or alternatively control the laser beam adjustment unit 238. The controller 236 may, for example, be a programmable logic controller. The controller 236 may cause the laser beam adjustment unit 238 to change the region of the photocathode 243 which is illuminated by the laser beam 241. The controller 236 may further cause the steering unit 240 to adjust the force which is applied to the electron beam E, in response to the change of the region of the photocathode 243 which is illuminated by the laser beam 241, such that the electron beam E continues to be coincident with the axis 245 after the adjustment. The steering unit 240 may, for example, adjust the force which is applied to the beam of electrons E by adjusting one or more electrical currents which flow through one or more electromagnets of the steering unit 240.

In an alternative embodiment the controller 236 may control one or more of the laser 235, the mirror 239 and the photocathode 243 in order to cause a change of the region of the photocathode 243 which is illuminated by the laser beam 241. In general the controller 236 may control any adjustment mechanism which is operable to change the region of the photocathode 243 which is illuminated by the laser beam 241.

In some embodiments the steering unit 240 may apply a force to the beam of electrons in response to a measurement of the electron beam E. For example, an electron beam measurement device (not shown) may be positioned in proximity to the electron beam E and may measure the position of the electron beam E. The steering unit 240 may use the measurement of the electron beam E to compute and apply a force to the electron beam E so that the electrons are coincident with the axis 245. When a change is made to the region of the photocathode on which the laser beam 241 is incident, this may cause a change in position of the electron beam E which may be measured by the electron beam measurement device. The electron beam measurement device may communicate the change in position of the electron beam to the steering unit 240. The steering unit 240 may adjust the force which is applied to the electron beam E in response to the change in position of the electron beam E such that the force applied by the steering unit alters the trajectory of the electron beam E so that the electrons are coincident with the axis 245.

In an embodiment the laser beam measuring device and the controller 236 may be used in combination. In such an embodiment, the laser beam measuring device may be in communication with the controller 236.

In some embodiments the steering unit 240 may not adjust the force which is applied to the electron beam E in response to a change of the region of the photocathode 243 which is illuminated by the laser beam 241. For example in an embodiment in which the region of the photocathode 243 which is illuminated by the laser beam 241 is changed by rotating the photocathode 243 whilst the position of the laser beam 241 remains constant, the positional displacement 253 and the angular displacement 252 of the electron beam E from the axis 245 do not change. In such an embodiment the trajectory of the electron beam E may continue to be altered by the steering unit 240 such that the electrons are coincident with the axis 245 without an adjustment of the force applied by the steering unit 240 on the electron beam E.

In some embodiments the position and/or the orientation of the electron gun 231 may be adjusted in response to a change in the region of the photocathode 243 which is illuminated by the laser beam 241. For example in response to a change in the region of the photocathode 243 which is illuminated by the laser beam 241 the position and/or the orientation of the electron gun 231 may be adjusted such that the trajectory of the electrons leaving the electron gun 231 is substantially the same as the trajectory of the electrons before the change in the region of the photocathode 243 which is illuminated by the laser beam 241. In such an embodiment the force which is applied to the electron beam E by the steering unit 240 may remain substantially constant. Alternatively both the position and/or the orientation of the electron gun 231 and the force which is applied to the electron beam E by the steering unit 240 may be adjusted in response to a change in the region of the photocathode 243 which is illuminated by the laser beam 241.

The position and/or the orientation of the electron gun 231 may be adjusted using an actuator (not shown) which is operable to change the position and/or the orientation of the electron gun 231. In some embodiments the position and/or the orientation of the electron booster 233 may also be adjusted along with an adjustment in the position and/or the orientation of the electron gun 231 (for example using an actuator).

In some embodiments the region of the photocathode 243 which is illuminated by the laser beam 241 may be changed so that the laser beam 241 is scanned across the photocathode 243. The laser beam 241 may be scanned over substantially all of the photocathode 243. Alternatively the laser beam 241 may be scanned over substantially all of the photocathode 243 except the impact region 249.

In other embodiments the laser beam 241 may only be scanned over a portion of the photocathode 243. For example, the region of the photocathode 243 which is illuminated by the laser beam 241 may remain inside an inner portion 255 of the photocathode 243 (shown in FIG. 13). The inner portion 255 may correspond to the portion of the photocathode 243 which lies within a distance R from the axis 245. The distance R may represent the maximum positional displacement 253 of the electron beam E from the axis 245 for which the steering unit 240 may be operable to apply a force which adjusts the trajectory of the electron beam E so that the electrons are coincident with the axis 245. For example an electron beam E emitted from a region outside of the inner region 255 may be so far displaced from the axis 245 that the electron beam E may collide with the outer extent of the beam passage 234 before reaching the steering unit 240. Alternatively the electron beam E may reach the steering unit 240 at a displacement from the axis 245 which is too great for the steering unit 240 to alter the trajectory of the electron beam E so that the electrons are coincident with the axis 245.

It may be desirable for electron bunches which leave the injector 230 to have a particular shape and charge distribution. For example, it may be desirable for an electron bunch to have a circular cross-section and have an even charge density along its length. However the force which is applied to the electron beam E by the steering unit 240, in addition to altering the trajectory of the electron beam E, may also cause a change in the shape and/or the charge distribution of bunches of the electron beam E. For example the steering unit 240 may compress or expand a bunch of electrons E in a particular direction.

In order to reduce the effects of any changes in the shape and/or charge distribution of an electron bunch caused by the steering unit 240, the shape of the region of the photocathode 243 which is illuminated by the laser beam 241 may be controlled to produce an electron bunch which has a desirable shape and/or charge distribution after passing through the steering unit 240. For example, the region of the photocathode 243 which is illuminated by the laser beam 241 may be elliptically shaped so as to cause an electron bunch having an elliptical cross-section to be emitted from the photocathode 243. The electron bunch may subsequently be compressed by the steering unit 240 along a semi-major axis of the elliptical cross-section of the electron bunch such that the electron bunch is compressed into having a circular cross-section when it leaves the injector 230.

In general the shape of the region of the photocathode 243 which is illuminated by the laser beam 241 may be controlled such that the beam of electrons emitted from the illuminated region takes on one or more desired properties after the steering unit 240 applies a force to the beam of electrons. The one or more desired properties may, for example, be a particular shape and/or charge distribution of electron bunches of the beam of electrons.

The force which is applied to the electron beam E by the steering unit 240 may be different for different regions of the photocathode 243 which are illuminated by the laser beam 241. Any change in the shape and/or charge distribution of electron bunches caused by the steering unit 240 may therefore be different for electron bunches which are emitted from different regions of the photocathode 243. For example, if the region of the photocathode 243 which is illuminated by the laser beam 241 is moved away from the axis 245 then the steering unit 240 may increase the force which is applied to the electrons E. This may also increase a change in the shape and/or charge distribution of electron bunches in the electron beam E caused by the steering unit 240.

In order to adapt to different changes in the shape and/or charge distribution of electron bunches which are emitted from different regions of the photocathode 243, the shape of the region of the photocathode 243 which is illuminated by the laser beam 241 may be adjusted for different positions of the laser beam 241 on the photocathode 243. For example if the region of the photocathode 243 which is illuminated by the laser beam 241 is moved away from the axis 245 then the eccentricity of an elliptically shaped illuminated region of the photocathode 243 may be increased. This may increase the eccentricity of the cross-sectional shape of electron bunches emitted from the photocathode 243 in anticipation of a larger compression of the shape of the electron bunches in the steering unit 240. This may ensure that the electron bunches which leave the steering unit 240 have a desirable shape and/or charge distribution.

The shape of the region of the photocathode 243 which is illuminated by the laser beam 241 may be controlled by the laser beam adjustment unit 238. For example the laser beam adjustment unit 238 may control the shape of the laser beam 241 such that the shape of region of the photocathode on which the laser beam 241 is incident is controlled to cause emission of electron bunches having desired properties (e.g. a desired shape and/or charge distribution). The desired properties of electron bunches emitted from the photocathode 243 may take into account any change in the properties of electron bunches which is expected to occur in the steering unit 240. The desired properties of electron bunches emitted from the photocathode 243 may be different for different regions of the photocathode 243 from which the electron bunches are emitted.

Additionally or alternatively the shape of the region of the photocathode 243 which is illuminated by the laser beam 241 may be controlled by controlling an actuator which is operable to change the position and/or the orientation of the mirror 239.

As noted further above, by separating the illumination region 251 from the impact region 249, the electron beam E is emitted from a region of the photocathode which receives fewer ion collisions and therefore is less prone to damage caused by ion collisions. This may extend the period of time for which an electron beam having a high peak current and a low emittance may be emitted from the photocathode 243 and may therefore extend the useful lifetime of the photocathode 243.

However, regions of the photocathode 243 outside of the impact region 249 may still be affected by ion collisions in the impact region 249 since ion collisions may cause sputtering of material from the photocathode 243 in the impact region 249. Some of the material which is sputtered from the impact region 249 may return to the photocathode 243 and may be deposited on regions of the photocathode 243 outside of the impact region 249. The sputtered material may, for example, be deposited inside a deposition region 254. The deposition region 254 may, for example, overlap with the illuminated regions 251, 251', as shown in FIG. 13.

Sputtered material which is deposited on a deposition region 254 of the photocathode 243 may alter the chemical composition of all or part of the deposition region 254 of the photocathode 243. This may cause the quantum efficiency of all or part of the deposition region 254 to be reduced. For example, the quantum efficiency of all or part of the illuminated region 251 may be reduced by deposited sputtered material. Unless the power of the laser beam 241 is increased in response to a reduction in the quantum efficiency of all or part of the illuminated region 251, then the peak current of the electron beam E which is emitted from the illuminated region 251 will be reduced.

Sputtered material may be deposited unevenly over the photocathode 243. For example more sputtered material may be deposited on regions of the photocathode 243 which are closer to the impact region 249 than may be deposited on regions which are further away from the impact region 249. This may, for example, cause radial gradients in the quantum efficiency of the photocathode 243.

Radial gradients in the quantum efficiency of the photocathode 243 may cause an uneven charge distribution of electron bunches emitted from the photocathode 243. For example, the quantum efficiency of the illuminated region 251 may be greater in a portion of the illuminated region 251 which is further away from the impact region 249 than in a portion of the illuminated region 251 which is closer to the impact region 249. When a pulse of the laser beam 241 is incident on the illuminated region 251, more electrons are therefore emitted from the portion of the illuminated region 251 which has a higher quantum efficiency than are emitted from the portion that has a lower quantum efficiency. An electron bunch will therefore be emitted which has an uneven charge distribution. This may be disadvantageous since the efficiency with which energy from electron bunches are converted to radiation in the undulator 24 may be reduced for electron bunches having an uneven charge distribution.

An uneven distribution of quantum efficiency of a photocathode 243 caused by sputtered material being deposited on the photocathode 243 may also cause instabilities in the current of an electron beam E which is emitted from the photocathode 243. The current instabilities may be erratic in nature and may have a high frequency. Such current instabilities are difficult to anticipate and correct for, for example, by modulating the power of the laser beam 241.

In addition to causing sputtering of material from the photocathode 243, ions which collide with the photocathode 243 may transfer some of their energy to the photocathode 243 in the form of heat energy. This may cause regions of the photocathode 243 to be heated. Heating of the photocathode 243 may cause some thermionic emission of electrons from the photocathode 243. Thermionic emission of electrons from the photocathode 243 may occur during pulses of the laser beam 241 and at times between pulses of the laser beam 241. Thus electrons may be emitted at times during which the photocathode 243 is not illuminated by the laser beam 241. Electrons which are emitted at times when the photocathode 243 is not illuminated by the laser beam 241 causes a flow of electrons from the photocathode 243 which is referred to as a dark current.

Dark current electrons are not synchronized with the high frequency reversing electromagnetic fields in the electron booster 233 or the linear accelerator(s) 22, 122, 150. Dark current electrons may therefore take on a wide range of energies depending on the time at which they arrive at the electron booster 233 and/or the linear accelerator(s) 22, 122, 150. The wide range of energies of dark current electrons means that elements of the free electron laser FEL which may be designed to direct or focus electrons in the free electron laser FEL may have varying effects on the dark current electrons. The dark current electrons may therefore be stray electrons which are difficult to control.

The stray dark current electrons may collide with elements of the free electron laser FEL which may cause damage to elements of the free electron laser. For example, dark current electrons may collide with magnetic components of the undulator 24, 124. This may cause demagnetization of the undulator which may reduce the useful lifetime of the undulator. Electrons may also collide with other components of the free electron laser such as the outer extent of the beam passage 234 which may cause the beam passage 234 to become radioactive.

As was described above, ion collisions with the photocathode 243 may cause sputtering of material from the photocathode 243 and/or heating of the photocathode 243 leading to an increased emission of a dark current from the photocathode 243. Both of these effects may have disadvantageous consequences in a free electron laser as was described above. It is therefore desirable to provide a photocathode 243 which reduces or obviates sputtering of material from the photocathode 243 and/or reduces heating of the photocathode 243 in the event of ion collisions with the photocathode 243.

Figure 14:
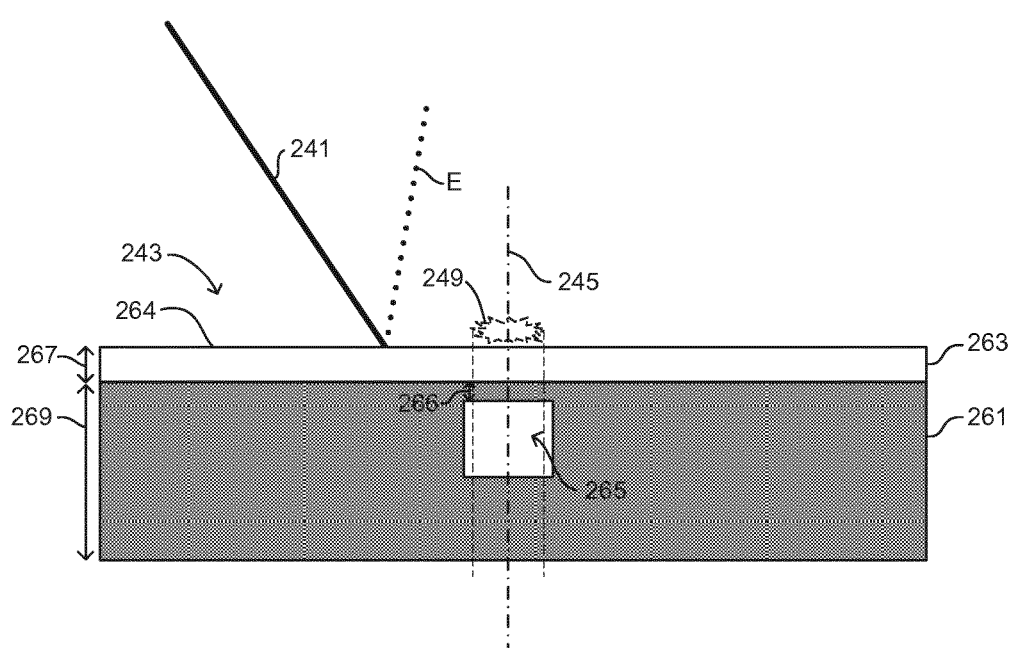
FIG. 14 is a schematic illustration of a cross-section through a photocathode which may be used by the electron injector of FIG. 13.

FIG. 14 is a schematic depiction of a photocathode according to an embodiment of the invention. FIG. 14 is a cross-section of the photocathode 243 (which may have the form shown in FIG. 13 when viewed from above). The photocathode 243 comprises a substrate 261 on which a film of material 263 is disposed. The substrate may, for example, comprise silicon, molybdenum, stainless steel or another suitable material. The substrate 261 may be polished in order to better facilitate deposition of the film of material 263 on the substrate 261.

The film of material 263 may comprise a material having a high quantum efficiency. The film of material 263 may, for example, have a quantum efficiency of a few percent. For example, the film of material 263 may have a quantum efficiency of approximately 5% (which may be considered to be a high quantum efficiency). The film of material 263 has a surface 264 on which the laser beam 241 is incident and from which a beam of electrons E is emitted. The surface 264 may be referred to as an electron emitting surface.

The film of material 263 may be a material comprising one or more alkali metals. The film of material 263 may be a compound comprising one or more alkali metals and antimony. For example, the film of material 263 may comprise sodium potassium antimonide. Components of the film of material 263 may be individually deposited on to the substrate 261. For example, in an embodiment in which the film of material 263 comprises sodium potassium antimonide, the antimonide may first be deposited on to the substrate followed by the potassium and then the sodium. The film of material 263 may be deposited onto the substrate 261 by atomic vapour deposition. The substrate 261 may be heated during the deposition process.

The thickness 267 of the film of material 263 may be significantly less than 1 micron. For example, the thickness 267 of the film of material 263 may be approximately a few tens of nanometers. The thickness 269 of the substrate 261 may be approximately a few millimeters. For example, the thickness 269 of the substrate 261 may be between 1 and 10 millimeters.

A photocathode 243 may alternatively be formed from a substrate 261 comprising a material which is configured to emit electrons when illuminated by the laser beam 241. Such a photocathode 243 may not have a film of material 263 disposed on the substrate 261. The electron emitting surface 264 may instead be a surface of the substrate 261. For example, the photocathode 243 may comprise a copper substrate 261 which includes an electron emitting surface. However, copper may have a relatively low quantum efficiency compared to, for example, a film of material comprising one or more alkali metals. Such a photocathode may not therefore be suitable for use in a free electron laser since a photocathode comprising a material having a high quantum efficiency is advantageous in a free electron laser.

In order to reduce the effects of ion collisions with the photocathode 243, a cavity 265 is formed in the substrate 261. The cavity 265 may be substantially aligned with the impact region 249. For example the cavity 265 may be positioned substantially beneath the impact region 249 as shown in FIG. 14. The cavity 265 may radially extend beyond the extent of the impact region 249 as is shown in FIG. 14. However, the impact region 249 is not a well-defined region but merely represents a region of the photocathode 243 with which ions may collide. In general the cavity 265 may be substantially aligned with a region of the photocathode 243 with which ions collide such that the ions may pass into the cavity 265. The cavity may be substantially aligned with an axis 245 of the injector 230 (see FIG.

12). The axis of the injector may correspond with a desired path of the electron beam E on leaving the injector 230.

The cavity 265 may be separated from the film of material 263 by a thin layer of the substrate 261 having a thickness 266. This may allow the cavity 265 to be positioned in close proximity to the film of material 263 whilst leaving a layer of substrate 261 having a smooth surface on which the film of material 263 may be deposited. The thin layer of the substrate 261 which separates the film of material 263 and the cavity 265 may, for example, have a thickness 266 which is between approximately 0.1 micron and approximately 10 microns.

Ions which collide with a photocathode pass through an upper layer of the photocathode before being stopped at a particular depth into the photocathode. The ions do not significantly interact with the portion of the photocathode through which they pass before being stopped by the photocathode. The majority of the damage caused by colliding ions therefore occurs at a depth into the photocathode which is at or close to the depth at which the ions are stopped by the photocathode.

Ions which collide with the photocathode 243 may therefore travel through the film of material 263, through the thin layer of the substrate 261 and into the cavity 265 without being stopped. The film of material 263 and the portion of the substrate 261 through which the ions pass may act to partially decelerate the ions but this deceleration may not be sufficient to stop the ions. Once the ions are in the cavity 265 there is no substrate material to decelerate them and they may pass through the cavity 265 without being further substantially decelerated. The ions may therefore pass out of the opposite side (i.e. opposite from the side through which they entered) of the cavity 265 and into substrate material below the cavity 265. The substrate material may serve to further decelerate the ions and stop the ions. The point at which the ions are stopped may therefore be below the cavity 265 because the ions pass through the cavity 265 before being decelerated and stopped by substrate material below the cavity 265. The cavity 265 therefore has the effect of shifting the position at which ions are stopped in the photocathode 261 to a greater depth into the photocathode 243 and away from the electron emitting surface 264 of the photocathode 243.

In an alternative embodiment the cavity 265 may extend through the rear of the substrate 261 such that the cavity 265 is open to the surroundings or another material. In such an embodiment the ions may pass through the cavity 265 and out of the photocathode 243 such that any damage caused by the ions occurs outside of the photocathode 243.

Increasing the depth at which ions are stopped in the photocathode 243 may cause less sputtering of material at the electron emitting surface 264 of the photocathode 243. Increasing the depth at which ions are stopped in the photocathode 243 may increase the depth at which energy is transferred from the ions to the photocathode 243 in the form of heat energy. This reduces the heating of the photocathode 243 close to the electron emitting surface 264 of the photocathode 243 and therefore reduces thermionic emission of electrons from the electron emitting surface 264 of the photocathode 243, thereby reducing the dark current in the free electron laser FEL. The cavity 265 may additionally reduce the amount of ions which may be retained in the substrate 261 near to the surface 264 and may therefore reduce any blistering of the surface 264 which may otherwise occur.

Figure 15:
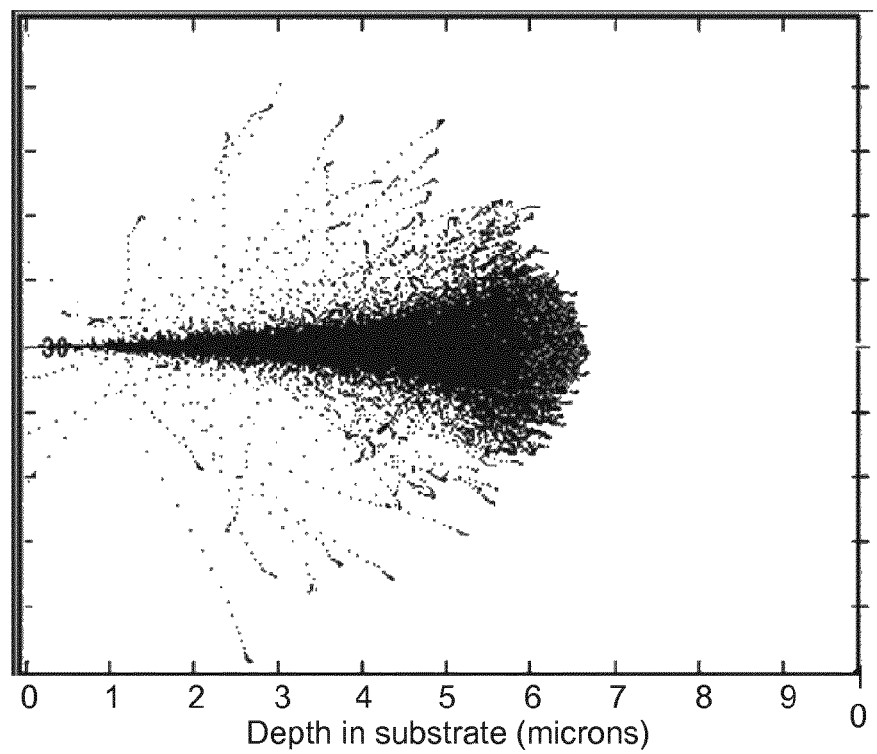
FIG. 15 is a representation of the stopping positions of ions in a silicon substrate.

The principles behind the invention may be further understood with reference to FIG. 15. FIG. 15 is a representation of the results of a simulation of positive hydrogen ions having energies of 500 keV colliding with a silicon substrate. An energy of 500 keV may approximately correspond to the energy of ions in a free electron laser. The dots represent positions in the substrate at which the hydrogen ions were stopped by the silicon substrate. As can be seen in FIG. 15 the majority of ions are stopped at a depth into the silicon target which is greater than approximately 4 microns. As was mentioned above the film of material 263 may have a thickness 267 which is much less than 1 micron. The majority of ions will therefore pass through the film of material 263 without being stopped.

The results displayed in FIG. 15 indicate that in an embodiment in which the substrate 261 comprises silicon and the thin layer of the substrate 261 which separates the cavity 265 from the layer of material 263 has a thickness 266 which is less than approximately 4 microns, then the majority of ions will pass through the thin layer of the substrate and into the cavity 265. Ions which pass into the cavity 265 will pass out of another side of the cavity 265 without being substantially decelerated. The ions will not therefore be stopped until passing into substrate material beyond the cavity.

It will be appreciated that different materials of a substrate 261 and ions having different energies may be stopped at different positions in a substrate than is shown in FIG. 15. The dimensions of a photocathode 243 and the arrangement of a cavity 265 may therefore be selected depending on the materials of the photocathode 243 and on the intended use of the photocathode 243.

In general, the cavity 265 in the substrate 261 may be positioned such that the thickness of a portion of the photocathode 243 disposed between the surface 264 and the cavity 265 is sufficiently thin that the majority of ions incident at that portion of the photocathode 243 pass through that portion of the photocathode 243 and into the cavity 265. The thickness of the portion of the photocathode disposed between the surface 264 and the cavity 265 may for example be less than approximately 10 microns, and may be less than approximately 5 microns.

During operation, a photocathode 243 may be subjected to electrostatic pressure resulting from the electric field associated with the voltage of the photocathode 243. The electric field associated with the voltage of the photocathode 243 may, for example, have a field strength of approximately 10 MVm$^{-1}$. This may cause the photocathode 243 to be subjected to an electrostatic pressure of approximately 1000 Pascals.

Figure 16:
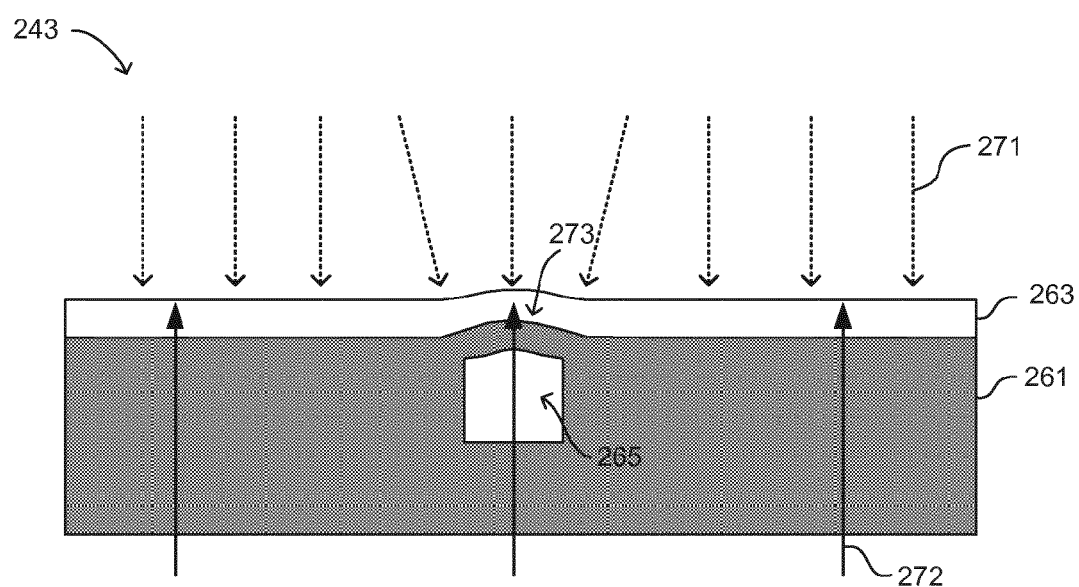
FIG. 16 is a schematic illustration of a cross-section through a photocathode subjected to electrostatic pressure.

FIG. 16 is a schematic depiction of the same cross-section of a photocathode 243 as shown in FIG. 14 when electrostatic pressure is applied to the photocathode. The direction of the electrostatic pressure on the photocathode 243 is indicated by arrows 272. The cavity 265 may structurally weaken the photocathode 243 in the region of the cavity 265. For example, the thin layer of the photocathode 243 which lies immediately above the cavity 265 may not be strong enough to withhold the electrostatic pressure to which it is subjected. This may cause a region 273 of the photocathode 243 to be deformed under the electrostatic pressure.

Deformation of the photocathode 243 may cause an alteration of the electric field in the deformed region 273. The direction of the electric field around the photocathode 243 is indicated by arrows 271 in FIG. 16. The direction of the electric field in the deformed region 273 is altered by the deformation to the photocathode 243. In particular the electric field 271 may be focused in the deformed region 273. This may be disadvantageous since it may alter the emittance and trajectory of electron bunches which are emitted from the photocathode 243. It may therefore be advantageous to reduce any deformation of the photocathode 243 caused by electrostatic pressure and/or to reduce or mitigate the effect of any deformation of the photocathode 243 on the electric field around the photocathode 243.

Figure 17A:
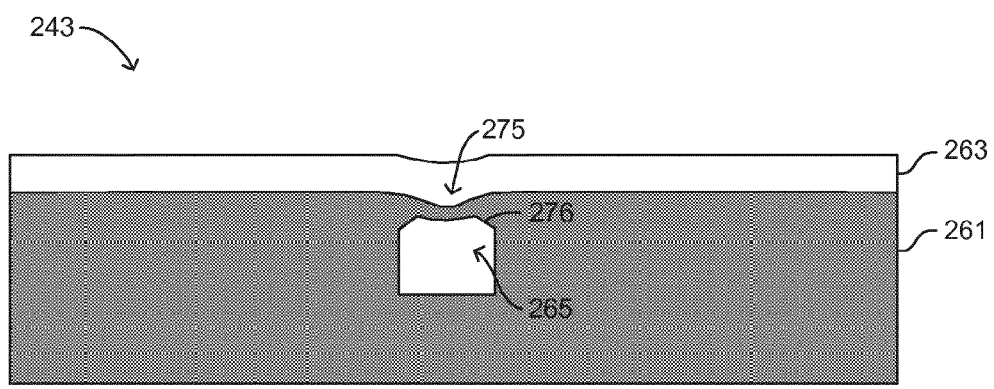
FIG. 17*a* is a schematic illustration of a cross-section through a photocathode configured to take on a desired shape upon exposure to an electrostatic pressure.

FIG. 17*a* is a schematic depiction of a photocathode 243 before a voltage is applied to the photocathode 243. Because no voltage is being applied to the photocathode 243 the photocathode is not subjected to any electrostatic pressure. The photocathode 243, shown in FIG. 17*a*, is shaped to anticipate being deformed under electrostatic pressure once a voltage is applied to the photocathode 243. That is the photocathode 243 is configured to take on a desired shape after being deformed under electrostatic pressure. In particular the substrate 261 is shaped to comprise an indentation 275 in the region above the cavity 265.

Optionally the cavity 265 may also be shaped in anticipation of experiencing electrostatic pressure. For example, the cavity 265 may be shaped to include a chamfer 276 as depicted in FIG. 17*a*. The chamfer 276 acts to reduce stress in regions of the substrate 261 which surround corners of the cavity 265. This may reduce the risk of cracks developing in the substrate in these regions as a result of the electrostatic pressure applied to the photocathode 243.

Figure 17B:
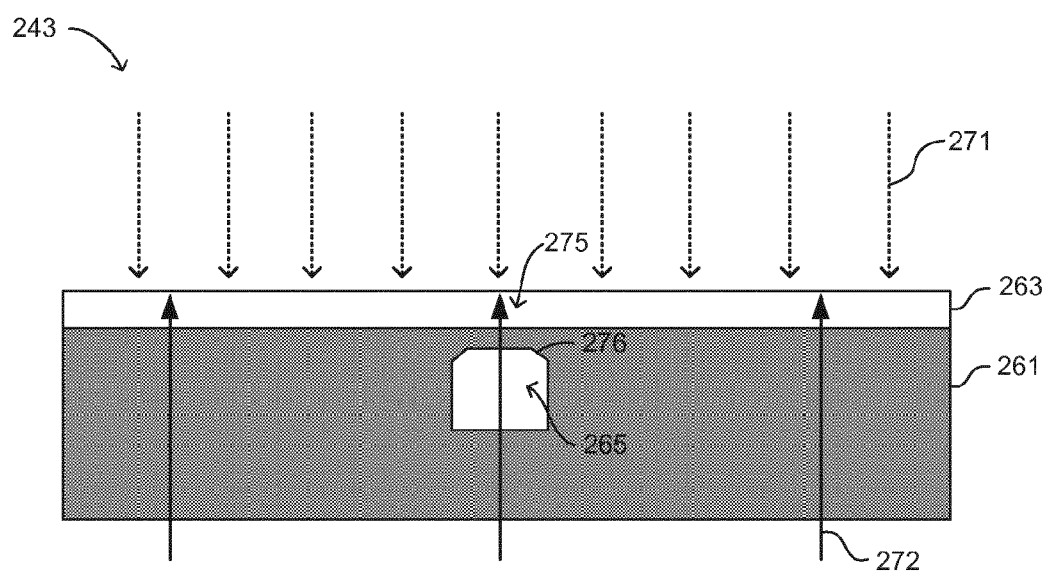
FIG. 17*b* is a schematic illustration of a cross-section through the photocathode of FIG. 17*a* whilst being subjected to an electrostatic pressure.

FIG. 17*b* is a schematic depiction of the same photocathode 243 as was depicted in FIG. 17*a* when a voltage is applied to the photocathode 243. The electrostatic pressure 272 to which the photocathode 243 is subjected causes a deformation of the previously indented region 275 of the substrate 261. After deformation the previously indented region 275 is no longer indented and the upper surface of the substrate 261 is substantially flat. After deformation of the previously indented region 275 the electric field direction 271 is substantially uniform and thus electron bunches emitted from the photocathode 243 may be substantially unaffected by the presence of the cavity 265.

The photocathode 243 depicted in FIGS. 17*a* and 17*b* is purely an example of an embodiment of a photocathode 243. It will be appreciated that other photocathodes 243 may be shaped and configured differently in anticipation of electrostatic pressure which may be exerted on the photocathode 243. The particular shaping and configuration of a photocathode 243 may depend amongst other things on the materials from which the photocathode 243 is constructed and the intended operating conditions of the photocathode 243.

Alternatively a photocathode 243 may be constructed in order to resist an electrostatic pressure such that the electrostatic pressure does not substantially deform the photocathode 243. For example the substrate 261 and the film of material 263 in the region of the cavity 265 may be sufficiently stiff to withstand an electrostatic pressure which is expected to be applied to the photocathode 243 during operation.

Figure 18:
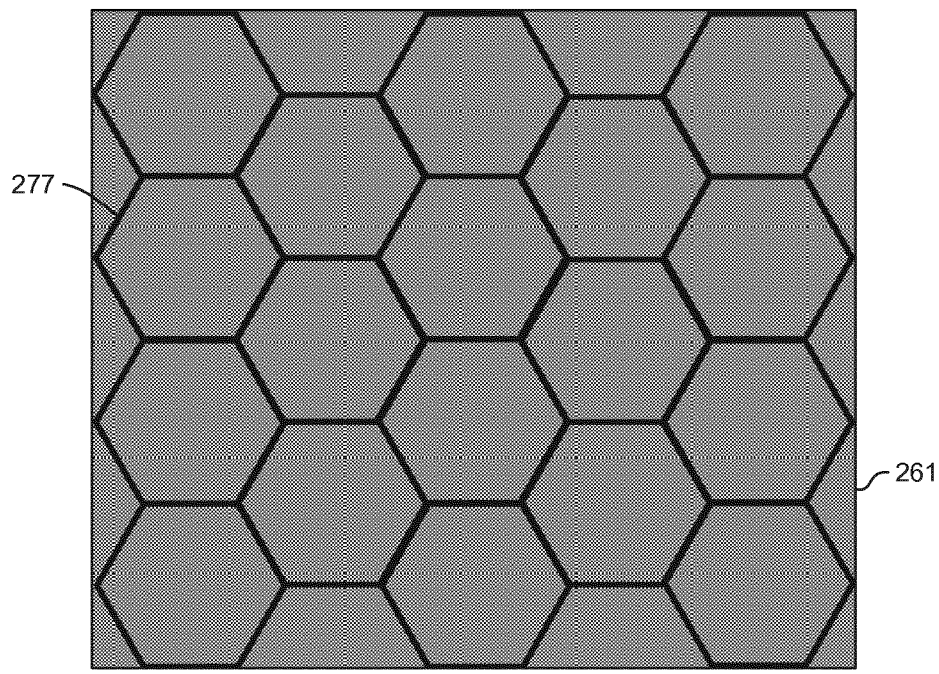
FIG. 18 is a schematic illustration of a plan view of a portion of a substrate comprising reinforcing ribs.

In order to strengthen a photocathode 243, reinforcing ribs may added to the substrate 261. The reinforcing ribs may help to resist deformation under an electrostatic pressure. FIG. 18 is plan view of a portion of substrate 261 comprising reinforcing ribs 277. The reinforcing ribs 277 are arranged in a honeycomb structure and may act to strengthen the substrate 261. The reinforcing ribs 277 may additionally help to cool the substrate 261. The ribs 277 may, for example, radiate heat from the substrate 261 to the surroundings thereby cooling the substrate 261. In alternative embodiments the reinforcing ribs 277 may be arranged to form a structure other than a honeycomb structure.

It may be desirable that the reinforcing ribs 277 do not substantially prevent ions from passing through the substrate 261. For example, it may be desirable that the reinforcing ribs do not substantially prevent ions from passing into the cavity 265. This may be achieved by providing a substantial separation between reinforcing ribs 277 (relative to the thickness of the ribs). This may ensure that the fraction of the substrate 261 which is occupied up by the reinforcing ribs 277 is relatively small (e.g. less than 10%). The proportion of ions incident on the substrate 261 which collide with the ribs 277 is therefore relatively small and thus an insubstantial proportion of ions are prevented from passing through the substrate 261 by the reinforcing ribs 277.

Additionally or alternatively the thickness of the ribs 277 may be sufficiently thin that ions may pass through the ribs 277 such that the ribs 277 do not substantially prevent ions from passing through the substrate 261. The thickness of the reinforcing ribs 277 may, for example, be less than approximately 1 micron.

The reinforcing ribs 277 may be positioned not throughout the substrate 261 but may in particular be positioned in portions of the substrate 261 which are subjected to large amounts of stress when a voltage is applied to the photocathode 243. For example, the reinforcing ribs 277 may be positioned to reinforce the layer of the substrate 261 which separates the film of material 263 and the cavity 265 since this layer of the substrate 261 may be subjected to a large amount of stress during use.

Figure 19:
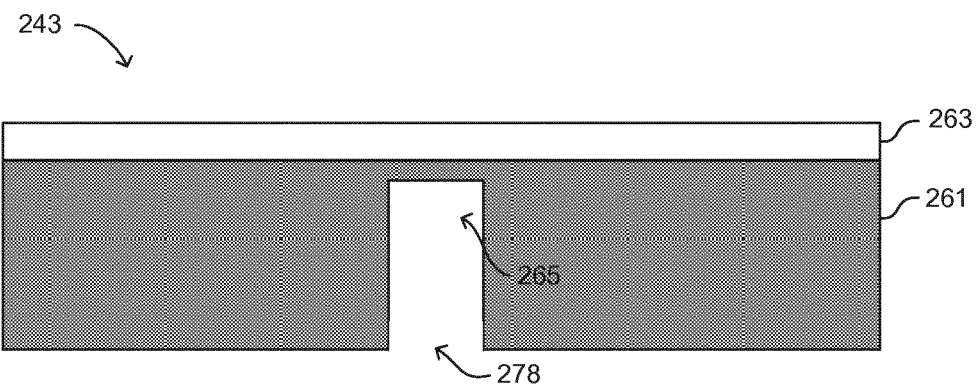
FIG. 19 is a schematic illustration of a cross-section through a photocathode comprising a cavity with an opening.

Embodiments of a photocathode 243 have been described above as comprising a cavity 265 formed in a substrate 261 which is enclosed by the material of the substrate 261. However in some embodiments the cavity 265 may be open to the surroundings or other materials. FIG. 19 is a schematic depiction of a photocathode 243 comprising a cavity 265 which extends to the base of the substrate 261. Ions which pass into the cavity 265 may therefore travel through the cavity and out of an opening 278 formed by the cavity 265. A material may optionally be positioned beyond the opening 278 in order to absorb and stop ions which pass through the opening. This may ensure that any damage caused by the ions occurs outside of the photocathode 243.

Although embodiments of an electron source have been described in relation to a laser 235 which emits a laser beam 241 which is incident on a photocathode 243, it should be appreciated that in other embodiments a radiation source other than a laser may be used. The radiation source may emit a radiation beam which is not a laser beam. Any reference above to a laser and/or a laser beam may therefore, in some embodiments, be substituted for a radiation source and/or a radiation beam respectively.

Although embodiments of a free electron laser have been described as comprising a linear accelerator 22, 150, 122, it should be appreciated that a linear accelerator is merely an example of a type of particle accelerator which may be used to accelerate electrons in a free electron laser. A linear accelerator may be particularly advantageous since it allows electrons having different energies to be accelerated along the same trajectory. However in alternative embodiments of a free electron laser other types of particle accelerators may be used to accelerate electrons to relativistic speeds.

The term "relativistic electrons" should be interpreted to mean electrons which travel at relativistic speeds. In particular relativistic electrons may be used to refer to electrons which have been accelerated to relativistic speeds by a particle accelerator.

It will be appreciated that the injector and injector arrangements depicted in the Figures are merely embodiments, and that other injector arrangements in accordance with the present invention are possible.

It is to be understood that while a lithographic system comprising eight lithographic apparatus LA1-LA8 is referred to above, more or fewer lithographic apparatus may be provided in a lithographic system. Further, one or more of the lithographic apparatus LA1-LA8 may comprise a mask inspection apparatus MIA. In some embodiments, the lithographic system may comprise two mask inspection apparatuses to allow for some redundancy. This may allow one mask inspection apparatus to be used when the other mask inspection apparatus is being repaired or undergoing maintenance. Thus, one mask inspection apparatus is always available for use. A mask inspection apparatus may use a lower power radiation beam than a lithographic apparatus.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatus may be generally referred to as lithographic tools. Such a lithographic tool may use vacuum conditions or ambient (non-vacuum) conditions.

Embodiments of the invention may form part of a lithographic apparatus which uses an electron beam or multiple electron beams to pattern a substrate.

The term "EUV radiation" may be considered to encompass electromagnetic radiation having a wavelength within the range of 5-20 nm, for example within the range of 13-14 nm. EUV radiation may have a wavelength of less than 10 nm, for example within the range of 5-10 nm such as 6.7 nm or 6.8 nm.

The lithographic apparatuses LA1 to LA8 may be used in the manufacture of ICs. Alternatively, the lithographic apparatuses LA1 to LA8 described herein may have other applications. Possible other applications include the manufacture of integrated optical systems, guidance and detection patterns for magnetic domain memories, flat-panel displays, liquid-crystal displays (LCDs), thin-film magnetic heads, etc.

While specific embodiments of the invention have been described above, it will be appreciated that the invention may be practiced otherwise than as described. The descriptions above are intended to be illustrative, not limiting. Thus it will be apparent to one skilled in the art that modifications may be made to the invention as described without departing from the scope of the claims set out below.

The invention claimed is:

1. An electron injector comprising:
   a support structure arranged to support a photocathode;
   a beam delivery system arranged to direct a beam of radiation from a radiation source onto a region of the photocathode thereby causing the photocathode to emit a beam of electrons;
   an adjustment mechanism operable to change the region of the photocathode which is illuminated by the radiation beam; and
   a steering unit operable to apply a force to the beam of electrons to alter its trajectory such that the electrons become substantially coincident with an axis of the electron injector.

2. The electron injector of claim 1, wherein the steering unit comprises one or more electromagnets.

3. The electron injector of claim 1, wherein the steering unit is downstream of an electron booster of the electron injector.

4. The electron injector of claim 1, wherein the region of the photocathode which is illuminated by the radiation beam is separated from the axis of the electron injector.

5. The electron injector of claim 1, wherein the beam delivery system is configured such that the radiation beam is not perpendicular to the photocathode when it is incident upon the photocathode.

6. The electron injector of claim 1, wherein the adjustment mechanism comprises a radiation beam adjustment unit in the beam delivery system, the radiation beam adjustment unit being operable to change one or more properties of the radiation beam.

7. The electron injector of claim 6, wherein the radiation beam adjustment unit is operable to change the direction of propagation of the radiation beam.

8. The electron injector of claim 1, wherein the beam delivery system comprises a mirror arranged to reflect the radiation beam onto a region of the photocathode and wherein the adjustment mechanism comprises an actuator operable to change the position and/or the orientation of the mirror.

9. The electron injector of claim 6, wherein the adjustment mechanism is operable to control the shape of the region of the photocathode which is illuminated by the radiation beam.

10. The electron injector of claim 9, wherein the adjustment mechanism is operable to control the shape of the region of the photocathode which is illuminated by the radiation beam such that the beam of electrons emitted from the illuminated region takes on one or more desired properties after the steering unit applies a force to the beam of electrons.

11. The electron injector of claim 1, wherein the adjustment mechanism comprises an actuator operable to change the position and/or the orientation of the photocathode.

12. The electron injector of claim 11, wherein the actuator is operable to rotate the photocathode.

13. The electron injector of claim 1, further comprising a controller wherein the controller is operable to control the adjustment mechanism in order to control the change of the region of the photocathode which is illuminated by the radiation beam.

14. The electron injector of claim 1, wherein the steering unit is operable to adjust the force which is applied to the beam of electrons in response to the region of the photocathode which is illuminated by the radiation beam.

15. The electron injector of claim 13, wherein the controller controls the adjustment of the force which is applied to the beam of electrons in response to the change of the region of the photocathode which is illuminated by the radiation beam.

16. The electron injector of claim 1, further comprising an electron beam measurement device operable to measure one or more properties of the beam of electrons.

17. The electron injector of claim 16, wherein the steering unit is operable to adjust the force which is applied to the beam of electrons in response to the measurement of one or more properties of the beam of electrons.

18. The electron injector of claim 1, wherein the radiation source is a laser and the beam of radiation is a laser beam.

19. The electron injector of claim 18, wherein the laser is a picosecond laser.

20. The electron injector of claim 1, wherein the beam of electrons comprises a plurality of bunches of electrons.

21. The electron injector of claim 1, wherein the electron injector further comprises an electron booster operable to accelerate the beam of electrons.

22. The electron injector of claim 1, wherein the axis represents a desired trajectory of the beam of electrons which is output from the electron injector.

23. The electron injector of claim 1, wherein the support structure is housed in an electron gun and wherein the electron injector further comprises an actuator operable to adjust the position and/or the orientation of the electron gun.

24. The electron injector of claim 23, wherein the actuator is operable to adjust the position and/or the orientation of the electron gun in response to the change in the region of the photocathode which is illuminated by the radiation beam.

25. A free electron laser comprising:
  an electron injector comprising:
    a support structure arranged to support a photocathode;
    a beam delivery system arranged to direct a beam of radiation from a radiation source onto a region of the photocathode thereby causing the photocathode to emit a beam of electrons;
    an adjustment mechanism operable to change the region of the photocathode which is illuminated by the radiation beam; and
    a steering unit operable to apply a force to the beam of electrons to alter its trajectory such that the electrons become substantially coincident with an axis of the electron injector;
  a particle accelerator operable to accelerate the beam of electrons to relativistic speeds; and
  an undulator operable to cause the relativistic electrons to follow an oscillating path thereby causing them to stimulate emission of coherent radiation.

26. The free electron laser of claim 25, wherein the undulator is configured to cause the relativistic electrons to emit EUV radiation.

27. The free electron laser of claim 25, wherein the particle accelerator is a linear accelerator.

28. The free electron laser of claim 27, wherein the linear accelerator is an energy recovery linear accelerator, and wherein the free electron laser further comprises a merging unit configured to combine the electron beam output from the electron injector with a recirculating electron beam.

29. A method of producing an electron beam using an electron injector, the method comprising:
  directing a beam of radiation onto a region of a photocathode thereby causing the photocathode to emit a beam of electrons;
  changing the region of the photocathode which is illuminated by the radiation beam; and
  applying a force to the beam of electrons to alter its trajectory such that the electrons become substantially coincident with an axis of the electron injector.

30. The method of claim 29, wherein the applying a force to the beam of electrons comprises using one or more electromagnets to generate a magnetic field so as to alter the trajectory of the beam of electrons.

31. The method of claim 29, wherein the region of the photocathode which is illuminated by the radiation beam is separated from the axis of the electron injector.

32. The method of claim 29, wherein changing the region of the photocathode which is illuminated by the radiation beam comprises changing one or more properties of the radiation beam.

33. The method of claim 29, wherein changing the region of the photocathode which is illuminated by the radiation beam comprises changing the position and/or the orientation of the photocathode.

34. The method of claim 33, wherein changing the position and/or the orientation of the photocathode comprises rotating the photocathode.

35. The method of claim 29, further comprising adjusting the force which is applied to the beam of electrons in response to the change of the region of the photocathode which is illuminated by the radiation beam.

36. The method of claim 29, further comprising measuring one or more properties of the beam of electrons.

37. The method of claim 36, further comprising adjusting the force which is applied to the beam of electrons in response to the measurement of one or more properties of the beam of electrons.

38. The method of any of claim 29, further comprising controlling the shape of the region of the photocathode which is illuminated by the radiation beam.

39. The method of claim 38, wherein the shape of the region of the photocathode which is illuminated by the radiation beam is controlled such that the beam of electrons emitted from the illuminated region takes on one or more desired properties after applying the force to the beam of electrons.

40. The method of claim 29, wherein the beam of electrons comprises a plurality of bunches of electrons.

41. The method of claim 29, wherein the axis represents a desired trajectory of the beam of electrons which is output from the electron injector.

42. A method for producing radiation comprising:
  producing an electron beam comprising:
  directing a beam of radiation onto a region of a photocathode thereby causing the photocathode to emit a beam of electrons;
  changing the region of the photocathode which is illuminated by the radiation beam; and
  applying a force to the beam of electrons to alter its trajectory such that the electrons become substantially coincident with an axis of the electron injector;
  accelerating the beam of electrons to relativistic speeds; and
  causing the relativistic electrons to follow an oscillating path thereby causing them to stimulate emission of coherent radiation.

43. The method of claim 42, wherein the relativistic electrons are caused to stimulate emission of EUV radiation.

* * * * *